United States Patent [19]

Kajiwara et al.

[11] Patent Number: 5,234,154
[45] Date of Patent: Aug. 10, 1993

[54] METHOD AND APPARATUS FOR JOINING HOT STRIPS

[75] Inventors: Toshiyuki Kajiwara, Tokyo; Tadashi Nishino, Hitachi; Tadayuki Watanabe, Hitachi; Yasutsugu Yoshimura, Hitachi; Takao Funamoto, Hitachi, all of Japan

[73] Assignee: Hitachi, Ltd., Tokyo, Japan

[21] Appl. No.: 874,797

[22] Filed: Apr. 27, 1992

[30] Foreign Application Priority Data

Apr. 26, 1991 [JP] Japan .................................. 3-096723
Mar. 30, 1992 [JP] Japan .................................. 4-074347

[51] Int. Cl.$^5$ ............................................. B23K 20/02
[52] U.S. Cl. .................................... 228/158; 228/5.7; 228/44.3; 228/212; 228/265
[58] Field of Search ................. 228/5.7, 44.3, 170, 228/212, 26, 265, 158

[56] References Cited

U.S. PATENT DOCUMENTS

| | | | |
|---|---|---|---|
| 3,256,419 | 6/1966 | Taylor et al. | 228/5.7 X |
| 3,325,623 | 6/1967 | Briggs, III | 219/102 |
| 4,711,114 | 12/1987 | Rohde et al. | 228/5.7 X |
| 5,100,050 | 3/1992 | Krueger et al. | 228/265 |

FOREIGN PATENT DOCUMENTS

| | | |
|---|---|---|
| 2018921 | 11/1971 | Fed. Rep. of Germany . |
| 2742151 | 3/1978 | Fed. Rep. of Germany . |
| 2844354 | 4/1980 | Fed. Rep. of Germany . |
| 51-130665 | 11/1976 | Japan . |
| 51-137649 | 11/1976 | Japan . |
| 60-102207 | 6/1985 | Japan . |
| 60-102207 | 6/1985 | Japan . |
| 250811 | 12/1985 | Japan .................................. 228/5.7 |
| 1332452 | 10/1973 | United Kingdom ................. 228/5.7 |

Primary Examiner—Kenneth J. Ramsey
Attorney, Agent, or Firm—Evenson, McKeown, Edwards & Lenahan

[57] ABSTRACT

A trailing end of a preceding bar is arranged slantingly by an angle $\theta$ relative to a succeeding bar such that the lower edge of the leading end face of the succeeding bar is vertically shifted from the lower edge of the trailing end face of the preceding bar with the leading end face of the succeeding bar abutting against the trailing end face of the preceding bar. After that, the succeeding bar is vertically depressed by applying a predetermined force. Since the trailing end face is inclined by $\theta$ relative to the leading end face, the depression causes a relative slide between surfaces of both the end faces and, at the same time, a pressure P is also produced by the wedge effect, the pressure P causing a compression force and a plastic deformation between both the end faces. Oxide scales on the contact surfaces of both the end faces are peeled off due to the plastic deformation and the relative slide, so that the metal surfaces of the material are exposed to join the bars simultaneously in combination with the compression force and the plastic deformation caused by the pressure P. Thus, the bars are joined to each other in a short time for realization of continuous hot rolling.

34 Claims, 21 Drawing Sheets

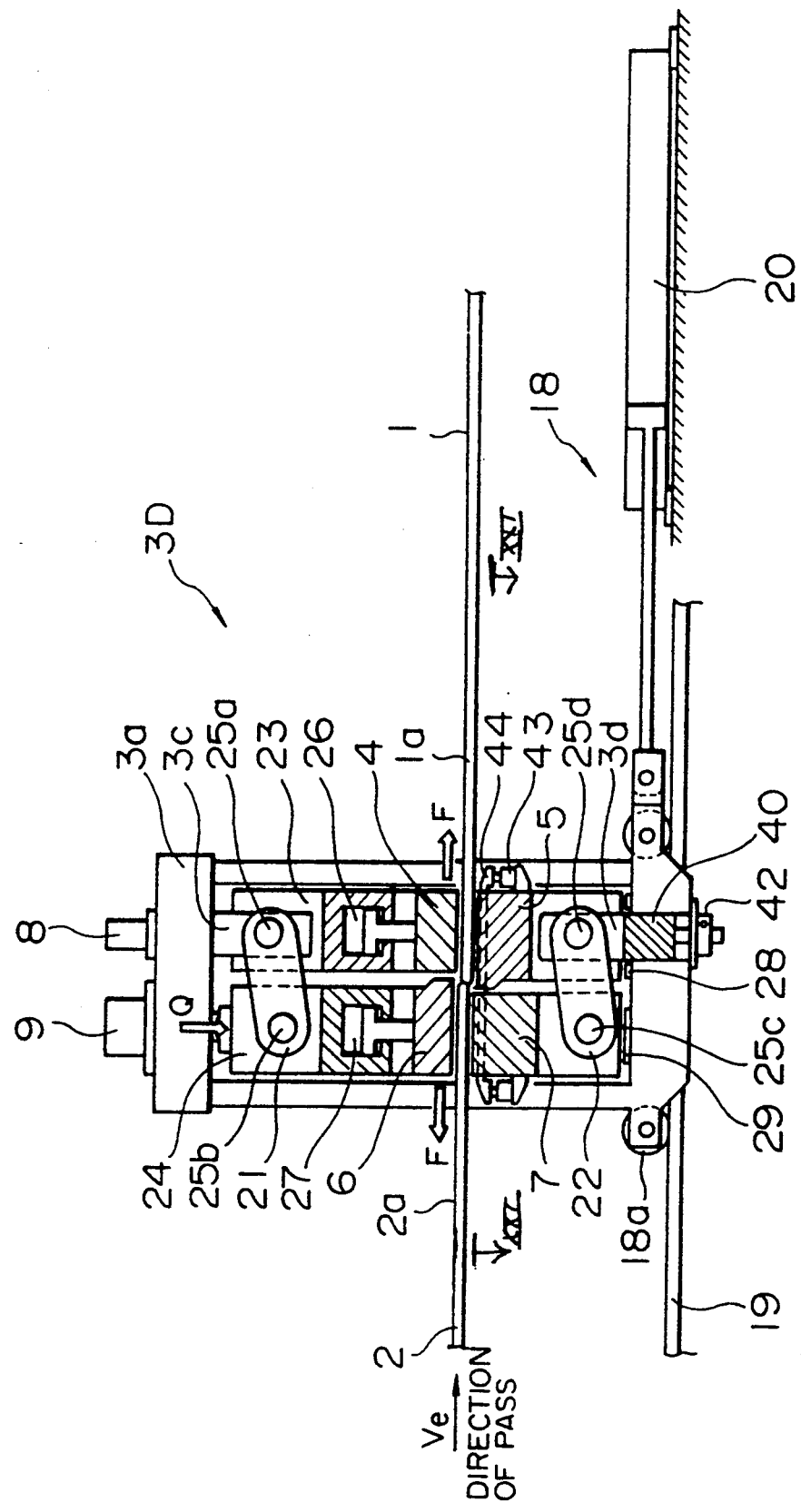

FIG.33(A) $t_1 = t_2$ 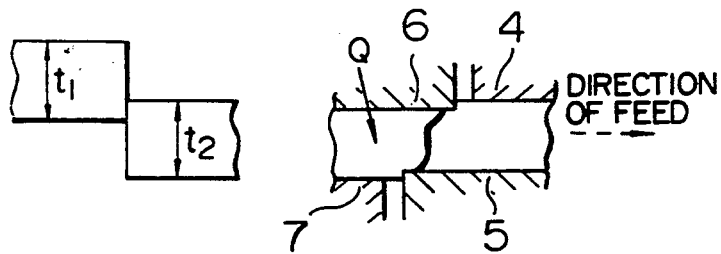
FIG.33(B) $t_1 > t_2$ 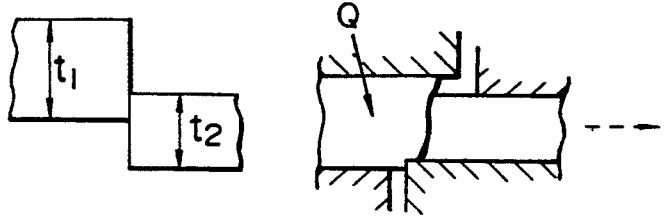
FIG.33(C) $t_1 < t_2$ 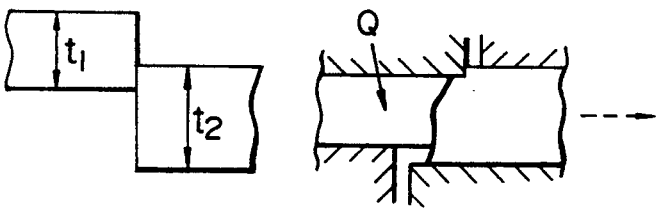

METHOD AND APPARATUS FOR JOINING HOT STRIPS

BACKGROUND OF THE INVENTION

The present invention relates to a rolling mill system for hot strips, and more particularly to a method and an apparatus for joining hot strips by which the hot strips can be joined to each other in a short time for continuous rolling, when the hot strips are rolled by using a train of roughing mill stands (roughing train) and a train of finishing mill stands (finishing train).

There is a very strong demand for realizing continuous finish-rolling in hot rolling mill systems of metals to achieve an improvement in productivity, a higher degree of quality, and automatization of operations. The key technique for that purpose resides in joining of bars to each other. If the joining of bars is not completed in a short time, the traveling distance of a joining machine would be so long as to make realization in practical use difficult when the joining machine is of the traveling type, for example. On the other hand, when the joining machine is of the fixed type, a quite large-scaled looper would be required to accumulate bars because the bars are usually as thick as 30 to 50 mm.

As a method of joining bars to each other, many techniques such as of the electrically heating type, gas heating type or solvent type have been proposed in the past. However, since those techniques have their merits and demerits, any of them has not yet been successfully put into practice. The severest one of those demerits is related to the joining time as suggested above. More specifically, the time required for joining bars is too much; i.e., it takes 20 to 30 seconds at minimum, including preparation before start of the joining, removal of swellings due to pressing, etc. Another problem is that joining conditions are delicate and the quality of the joining is affected by slight differences in the conditions. Therefore, the technique capable of surely joining bars to each other in a short time is essential to realize continuous rolling in a practicable manner.

For that reason, various methods of mechanically joining bars rather than those using electricity or gas which are time consuming, have been tried and proposed. For example, JP, A, 51-137649 discloses a method of placing bars in partly overlapped relation and pressing the bars. JP, A, 51-130665 and 60-102207 disclose a method of cutting bars obliquely relative to the direction of thickness and overlapping the cut surfaces of both the bars, followed by rolling to join the bars together.

However, the above conventional methods have suffered from the following problems.

First, with the prior art disclosed in JP, A, 51-37649, fresh surfaces which become joined surfaces are less created because of a small relative slide between both the bars. The experiment has proved that the joining of the bars is not satisfactory in quality.

Secondly, with the prior art disclosed in JP, A, 51-130665 and 60-102207, it is difficult to obliquely cut the bars by a usual guillotine cutter. This difficulty is further increased at a larger oblique cutting angle. Such an oblique cutting is feasible by using a milling cutter or the like, but this step takes a too much time. Even if the bars can be obliquely cut, the joining force of the bars is so weak that they are likely to disconnect upon slight extent of bending, tension or oscillation when rolling is made with overlapping the cut surfaces of both the bars, because scales on the joining surface are not sufficiently crashed and removed.

SUMMARY OF THE INVENTION

An object of the present invention is to provide a method and an apparatus for joining hot strips, as well as a method and a system for continuous hot rolling in which hot strips are securely joined in a short time for realization of continuous hot rolling.

To achieve the above object, according to the present invention, there is provided a hot strip joining method of joining a preceding strip and a succeeding strip to each other in line of a hot rolling mill system, wherein an end face of a trailing end of said preceding strip and an end face of a leading end of said succeeding strip are pressed against each other so as to cause a plastic deformation and also a relative slide between surfaces of both the end faces, thereby joining both said strips together.

Since the relative slide is caused between surfaces of the end face of the trailing end of the preceding strip and the end face of the leading end of the succeeding strip, while pressing both the end face surfaces against each other so as to cause the plastic deformation, oxide scales on the contact surfaces of both the end faces are peeled off to expose the metal surfaces of the material and, at the same time, the exposed surfaces are mutually compressed to thereby surely join the bars together in a short time.

In the above joining method, preferably, when causing the above relative slide, the preceding strip and the succeeding strip are relatively moved to come closer to each other, thereby causing the plastic deformation.

Also preferably, at least one of the trailing end of the preceding strip and the leading end of the succeeding strip is moved relative to the other in a direction inclined with respect to the end face of the other strip end, thereby causing the relative slide and the plastic deformation.

By moving at least one of the trailing end of the preceding strip and the leading end of the succeeding strip relative to the other in a direction inclined with respect to the end face of the other strip end, the resultant wedge effect causes the relative slide and simultaneously produced a force in the horizontal direction (in the direction of strip length). Thus, both the relative slide and the pressing inclusive of the plastic deformation can be performed with one operation.

In the above joining method, preferably, at least one of the trailing end of the preceding strip and the leading end of the succeeding strip is inclined relative to the other, and the trailing end of the preceding strip and the leading end of the succeeding strip are clamped such that both the ends are shifted from each other with one of the ends abutting against the other, and then at least one of the trailing end of the preceding strip and the leading end of the succeeding strip is relatively moved in a direction in which the shift between both the ends disappears, thereby causing the relative slide and the plastic deformation.

Alternatively, the trailing end of the preceding strip and the leading end of the succeeding strip may be clamped such that both the ends ar shifted from each other with one of the ends abutting against the other, and then at least one of the trailing end of the preceding strip and the leading end of the succeeding strip may be relatively moved in a direction inclined with respect to the end face of the other strip end, thereby causing the relative slide and the plastic deformation.

Also, at least one of the trailing end of the preceding strip and the leading end of the succeeding strip may be bent and the trailing end of said preceding strip and the leading end of said succeeding strip may be clamped such that the bent end is abutting against the other, and then the bent end may be straightened to thereby cause the relative slide and the plastic deformation.

Further, at least one end face of the trailing end of the preceding strip and the leading end of the succeeding strip may be cut obliquely, and the trailing end of the preceding strip and the leading end of the succeeding strip may be clamped such that both the ends are shifted from each other with one of the ends abutting against the other, and then at least one of the trailing end of the preceding strip and the leading end of the succeeding strip may be relatively moved in a direction in which the above shift between both the ends disappears, thereby causing the relative slide and the plastic deformation.

The relative slide is preferably caused in the direction of thickness of the strip, but it may be caused in the direction of width of the strip.

In the above joining method, preferably, when causing the relative slide while pressing both the end faces of the strips, the joined surfaces of the preceding strip and the succeeding strip are deformed into a zigzag pattern. Also preferably, the preceding strip and the succeeding strip are joined to each other with edges of one strip in the direction of strip width being shifted from edges of the other strip in the direction of strip width.

By deforming the joined surfaces of the preceding strip and the succeeding strip are deformed into a zigzag pattern when both the ends of the strips are subjected to the relative slide while pressing them, the joining strength against fluttering (vibration) during the feeding after the joining step is improved and the joined bars are prevented from separating during the feeding.

By shifting the edges of one of the preceding strip and the succeeding strip in the direction of strip width from the edges of the other strip in the direction of strip width at the time of joining, at least one of the edges of one strip in the direction of strip width bites into the end face of the other strip due to the plastic deformation and thus edge cracking is prevented.

To achieve the above object, according to the present invention, there is also provided a continuous hot rolling method in a hot rolling mill system including at least one roughing mill stand and a train of finishing mill stands, the method comprising the steps of (a) rolling a plurality of slabs by said roughing mill stand to successively obtain bars; (b) joining said bars to each other; (c) continuously rolling said joined bars by said train of finishing mill stands; and (d) when joining said bars to each other, pressing an end face of a trailing end of a preceding bar and an end face of a leading end of a succeeding bar against each other so as to cause a plastic deformation and also a relative slide between surfaces of both the end faces for joining of said bars.

To achieve the above object, according to the present invention, there is further provided a hot strip joining apparatus for joining a preceding strip and a succeeding strip to each other in line of a hot rolling mill system, the apparatus comprising (a) first and second metal die means for independently clamping a trailing end of said preceding strip and a leading end of said succeeding strip, respectively; and (b) drive means for actuating at least one of said first and second metal-die means such that one of the trailing end of said preceding strip and the leading end of said succeeding strip is moved relative to the other in a direction inclined toward an end face of the other strip end.

By using the first and second metal die means to independently clamp the trailing end of the preceding strip and the leading end of the succeeding strip, respectively, and actuating at least one of the first and second metal die means such that one of the trailing end of the preceding strip and the leading end of the succeeding strip is moved relative to the other in a direction inclined toward the end face of the other strip end, the end face of a trailing end of the preceding strip and the end face of a leading end of the succeeding strip are pressed against each other so as to cause a plastic deformation and also a relative slide between surfaces of both the end faces, thereby joining the preceding strip and the succeeding strip together as mentioned above.

In the above joining apparatus, preferably, the first and second metal die means are each constructed in a vertically movable manner.

Also preferably, the first and second metal die means are adapted to clamp the trailing end of the preceding strip and the leading end of the succeeding strip such that at least one of the trailing end of the preceding strip and the leading end of the succeeding strip is inclined relative to the other and such that both the ends are shifted from each other with one of the ends abutting against the other, and the drive means in adapted to actuate at least one of the first and second metal die means in a direction in which the above shift between both the ends disappears.

Preferably, the first and second metal die means are adapted to clamp the trailing end of the preceding strip and the leading end of the succeeding strip such that both the ends are shifted from each other with one of the ends abutting against the other, and the drive means is adapted to actuate at least one of the first and second metal die means in a direction in which one of the trailing end of the preceding strip and the leading end of the succeeding strip is moved toward the end face of the other strip end and in which the above shift between both the ends disappears.

Preferably, the joining apparatus further comprises position adjusting means for adjusting a vertical position of the strips.

Preferably, the joining apparatus further comprises transfer means for transporting the first and second metal die means and the drive means in a direction of advance of the strips.

In addition, preferably, the first and second metal die means each have a plurality of spike-shaped projections on their surfaces for clamping the strips, and the plurality of projections are arranged in a zigzag pattern with respect to a joining line defined by the joined surfaces of the strip ends. As an alternative, the first and second metal die means each have a plurality of rack tooth-shaped projections on their surfaces for clamping the strips, the plurality of projections being arranged in straddling relation to a joining line defined by the joined surfaces of the strip ends.

By providing a plurality of spike-shaped projections on the clamping surfaces of the first and second metal die means, and arranging the plurality of projections in a zigzag pattern with respect to the joining line defined by the joined surfaces of the strip ends, the joined surfaces of the preceding strip and the succeeding strip become zigzag to improve the joining strength against fluttering during the feeding.

By providing a plurality of rack tooth-shaped projections on the clamping surfaces of the first and second metal die means, and arranging the plurality of projections in straddling relation to the joining line defined by the joined surfaces of the strip ends, the joined surfaces of the preceding strip and the succeeding strip become zigzag to improve the joining strength against fluttering during the feeding.

To achieve the above object, according to the present invention, there is further provided a hot strip joining apparatus for joining a preceding strip and a succeeding strip to each other in line of a hot rolling mill system, the apparatus comprising (a) first and second movable metal die means for independently clamping a trailing end of said preceding strip and a leading end of said succeeding strip, respectively; (b) first actuator means for producing a drive force to act on at least one of said first and second metal die means; and (c) link means for operatively connecting said first and second metal die means whereby one of said first and second metal die means is moved relative to the other in a direction inclined toward the other upon acting of the drive force produced by said first actuator means.

By using the first and second movable metal die means for clamping the preceding strip and the succeeding strip, respectively, and producing the drive force to act on at least one of the first and second metal die means, one of the first and second metal die means is moved under an action of the link means in a direction inclined toward the other. As a result, the relative slide is caused between surfaces of the end face of the trailing end of the preceding strip and the end face of the leading end of the succeeding strip and, simultaneously, a horizontal pressing force is produced between both the end faces of the strips, whereby both the end faces are pressed against each other so as to cause the plastic deformation, bringing about a state suitable for the joining as mentioned above. In other words, due to the relative slide between surfaces of both the end faces and the pressing inclusive of the plastic deformation, oxide scales on the contact surfaces of both the strip end faces are peeled off to expose the metal surfaces of the material and, at the same time, the exposed surfaces are mutually compressed to thereby surely join the bars together in a short time.

On the other hand, the horizontal force produced due to the wedge effect during pressing both the strip end faces is borne by the link means and thus will not act on the vertically movable members in the body frame.

In the above joining apparatus, preferably the link means constitutes a quadrilateral link in cooperation with the first and second metal die means.

Also preferably, the joining apparatus further comprises second actuator means for moving one of the first and second metal die means relative to the other to form a level difference between the two metal die means in a direction perpendicular to the direction of strip length, and the link means is constructed such that the position of a fulcrum concerning the one metal die means remains the same when the one metal die means is moved by the second actuator means.

Preferably, the link means includes a plurality of links and a plurality of joint pins, and at least one of the plurality of joint pins is adjustable in its position, whereby an amount of movement of the one metal die means in a direction of strip length resulting from the action of the drive force produced by the first actuator means can be adjusted. With this arrangement, an amount of the plastic deformation at the time of pressing the strip end faces and hence an amount of the compression are adjusted.

Preferably, the joining apparatus further comprises first stopper means for limiting an amount of movement of the one metal die means in a direction perpendicular to the direction of strip length resulting from the action of the drive force produced by the first actuator means, the first stopper means being adjustable in its level of height.

Preferably, the joining apparatus further comprises second stopper means for limiting an amount of movement of the one metal die means in a direction perpendicular to the direction of strip length when moved by the second actuator means, the second stopper means being adjustable in its height level.

By making adjustable levels of the first and second stopper means for limiting an amount of movement of the one metal die means in a direction perpendicular to the direction of strip length, the amount of level difference between the preceding bar and the succeeding bar in the direction of bar thickness and the depression amount of the second metal die frame can be easily adjusted depending on the thickness of the bars. Further, the compression amount during the joining step can also be thereby adjusted.

Preferably, the first and second metal die means each include a pair of upper and lower metal dies, the lower metal die of the first metal die means having a length sufficient to support both the trailing end of the preceding strip and a part of the leading end of the succeeding strip, and the upper metal die of the second metal die means having a length sufficient to support both the leading end of the succeeding strip and a part of the trailing end of the preceding strip.

By thus setting the lengths of the lower metal die of the first metal die means and the upper metal die of the second metal die means sufficient to support even a part of the strip on the side where that strip is not directly clamped by the corresponding metal die means, swellings are prevented from occurring at the joined boundary and the probability that the joined bars may disconnect during the subsequent feeding and rolling after the joining step is reduced.

Preferably, the joining apparatus further comprises elevatable lift means for lifting the preceding strip and the succeeding strip from the surfaces of the first and second metal die means after they are joined. By raising the lift means to lift the preceding strip and the succeeding strip from the metal die surfaces after the joining step, the strips having bitten into the metal die surfaces during the joining step can be easily separated therefrom.

Preferably, the joining apparatus further comprises means for applying a force beforehand in a direction of load acting on the link means so as to remove a play. This permits precise adjustment of the compression amount.

In addition, the joining apparatus preferably further comprises means for oscillating at least one of the preceding strip and the succeeding strip when the one metal die means is moved by the link means in a direction inclined toward the other metal die means. Note that ultrasonic waves may be applied instead of the oscillation.

By moving the metal die unit while applying oscillation or ultrasonic waves to at least one of the preceding strip and the succeeding strip, crushing and dispersion of surface oxide scales at the joined ends of the strips are accelerated and the joining strength is enhanced.

Finally, to achieve the above object, according to the present invention, there is provided a continuous hot rolling mill system including at least one roughing mill stand and a train of finishing mill stands, the system comprising a joining apparatus installed between said roughing mill stand and said train of finishing mill stands and constructed as mentioned above for successively joining bars rolled by said roughing mill stand.

BRIEF DESCRIPTION OF THE DRAWINGS

FIG. 17 is a partial sectional side view of an apparatus for joining hot strips according to a fifth embodiment of the present invention.

FIGS. 33(A), 33(B) and 33(C) diagrammatically show one embodiment of the joining method of the present invention adapted for the case of bars being different in thickness from each other.

DETAILED DESCRIPTION OF THE PREFERRED EMBODIMENTS

Embodiments of the present invention will be described hereinafter with reference to the drawings.

Embodiments of Joining Method

First, principles of a joining method of the present invention will be explained. The method of joining hot strips according to the present invention is based on the findings as follows.

(1) The quality of joining between hot bars is dependent on a degree of cleanness C of the surfaces to be joined, a material temperature T and a pressing pressure P. It will be apparent from looking at lad rolling as an example that hot bars can be joined to each other even at the room temperature if the cleanness is perfect. In the case of hot strips, the cleanness is primarily affected by oxide scales. Accordingly, if oxide scales are not present, it is possible to join the hot strips together by compressing them at the pressure P depending on the material temperature T.

(2) A finishing process in hot rolling is usually performed by six to seven rolling mill stands and the joining strength is required only in those stands at the downstream stages which entail tension rolling. The experiments made by the inventors have proved that if hot bars can be joined to each other over a region of approximately 20% in the direction of thickness of the bars, the later steps of rolling enable the bars to be joined together throughout the entire thickness. This implies that joining of bars for continuous rolling is not necessarily required to be made completely over the entire regions of the joined surfaces.

A first embodiment of the joining method of the present invention will be next described with reference to FIGS. 1(A)–1(C).

Figure 1A:
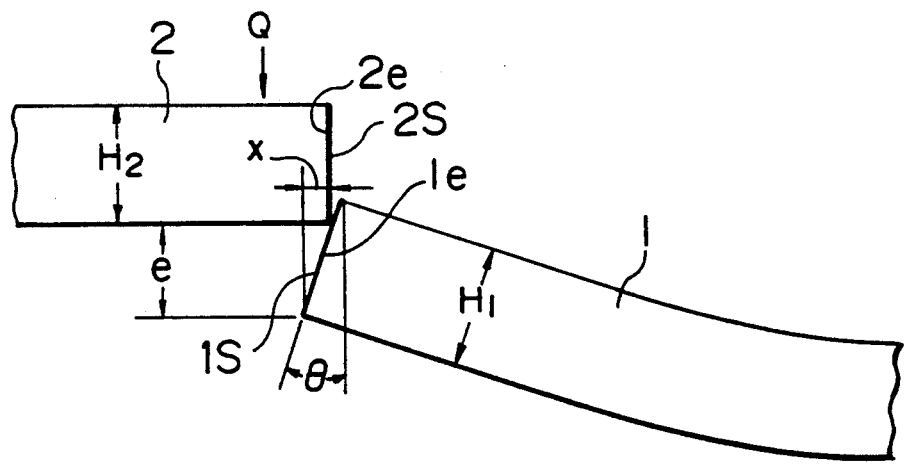
FIGS. 1(A), 1(B) and 1(C) diagrammatically show a method of joining hot strips according to a first embodiment of the present invention, FIGS. 1(A), 1(B) and 1(C) respectively showing successive steps of the method.
Figure 1B:
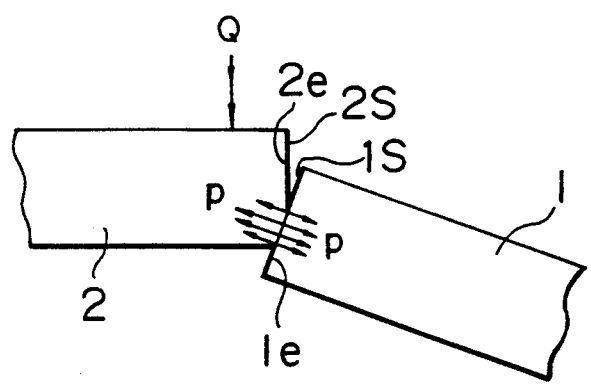
Figure 1C:
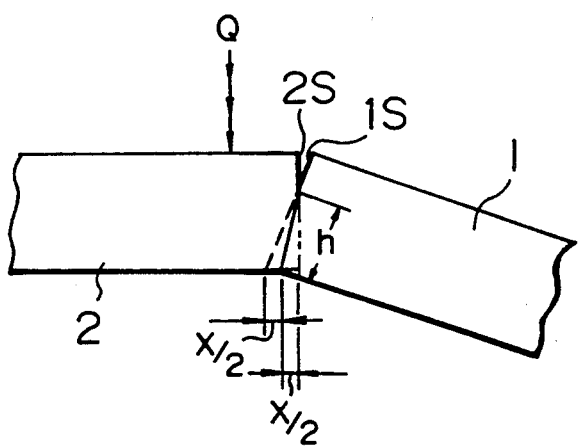

In FIGS. 1(A)–1(C), designated at 1 is a preceding bar and 2 is a succeeding bar. Oxide scales S1, S2 of which thickness is shown in the exaggerated form are respectively formed on a trailing end face 1e of the preceding bar 1 and a leading end face 2e of the succeeding bar 2. The trailing end face 1e of the preceding bar 1 and the leading end face 2e of the succeeding bar 2 are each cut at their crops beforehand by a traveling shear (not shown). However, since at least several seconds elapse after the shearing, it is inevitable that the oxide scales 1S, 2S occur on the trailing end face 1e and the leading end face 2e. Incidentally, the temperature of the bars 1, 2 at this point in time is approximately 1000° C. for steel and approximately 450° C. for aluminum.

The trailing end of the preceding bar 1 is arranged slantingly relative to the succeeding bar 2. Thus, the preceding bar 1 is standing by in such a state that the trailing end face 1e is inclined by an angle $\theta$ with respect to the vertical plane. As shown in FIG. 1(A), the lower edge of the leading end face 2e of the succeeding bar 2 is caused to abut against the trailing end face 1e of the preceding bar 1 at a position vertically upwardly shifted by an amount e from the lower edge of the trailing end face 1e of the preceding bar 1. After that, the succeeding bar is vertically depressed by applying a force Q.

FIG. 1(B) shows a state in the course of the depressing process. As will be seen from this drawing, with the trailing end face 1e inclined by $\theta$ relative to the leading end face 2e, when the succeeding bar 2 is forcibly depressed by the force Q, the leading end face 2e is pressed downwardly while biting into the trailing end face 1e. As a result, there occurs a relative slide between surfaces of both the end faces 1e and 2e due to the depression and, at the same time, a pressure P is also produced by the wedge effect resulted from the leading end face 2e biting into the trailing end face 1e. The pressure P causes a compression force and a plastic deformation between both the end faces 1e, 2e. Therefore, the oxide scales 1S, 2S on the contact surfaces of both the end faces 1e, 2e are peeled off due to the plastic deformation caused by the pressure P and the relative slide, so that the metal surfaces of the material are exposed to bring about a state suitable for the joining in combination with the compression force and the plastic deformation simultaneously caused by the pressure P.

The end state of the depression is shown in FIG. 1(C). When the succeeding bar 2 is depressed until the above shift e disappears, the bars are joined to each other over the region corresponding to a thickness h. Assuming now that the horizontal shift between the lower edge of the leading end face 2e of the succeeding bar 2 and the lower edge of the trailing end face 1e of the preceding bar 1 before the depression is x, the amounts of plastic deformation of the leading end face 2e of the succeeding bar 2 and the trailing end face 1e of the preceding bar 1 are each about x/2 at maximum. The proportion of the joined region h to a total bar thickness H increases through rolling steps on the downstream side. Note that even when the oxide scales 1S, 2S are not completely removed through the above-mentioned relative slide between surfaces of both the end faces and the bars are not joined together all over the region h, there can be obtained the joining strength enough to endure the following rolling step.

Other Embodiments of Joining Method

Figure 2:
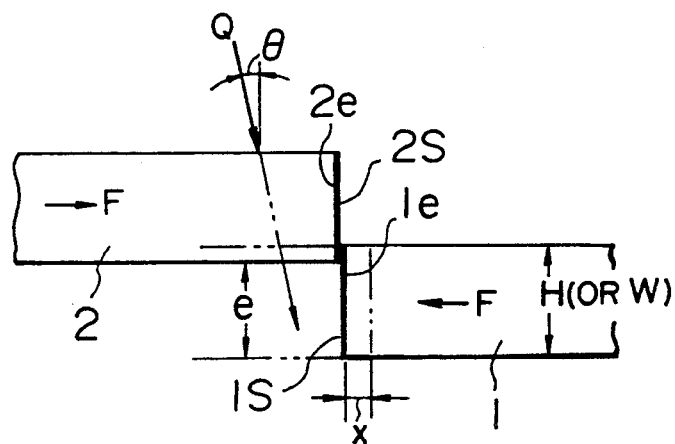
FIG. 2 is a diagram showing a method of joining hot strips according to a second embodiment of the present invention.

Joining methods according to other embodiments of the present invention will be described with reference to FIGS. 2 to 4. While the trailing end face 1e of the preceding bar 1 is inclined by the angle $\theta$ with respect to the vertical plane in the above embodiment, a similar operating action is obtained by other methods in the embodiments of FIGS. 2 to 4. More specifically, in the second embodiment shown in FIG. 2, the direction of the force Q is inclined by the angle $\theta$ rather than inclining the preceding bar 1. Thus, the succeeding bar 2 is moved while pressing the preceding bar 1 in such a manner that it is depressed in a direction inclined by $\theta$. By so doing, there similarly occur a relative slide, a compression force and a plastic deformation due to the wedge effect, enabling the preceding bar 1 and the succeeding bar 2 to be joined together. Assuming that the amount of movement of the succeeding bar 2 in the horizontal direction (i.e., in the direction of length of the bars) in this embodiment is x, the joining line is formed at a position of about x/2 and the amounts of plastic deformation of the leading end face 2e of the succeeding bar 2 and the trailing end face 1e of the preceding bar 1 are each approximately x/2 at maximum.

Alternatively, without inclining the direction of the force Q, the end faces 1e, 2e of the bars 1, 2 may be relatively slid while mutually pressing the bars 1, 2 under a force F. This also causes the succeeding bar 2 to move while pressing the preceding bar 1 at an inclination of $\theta$, with the result of a similar advantage.

Figure 3:
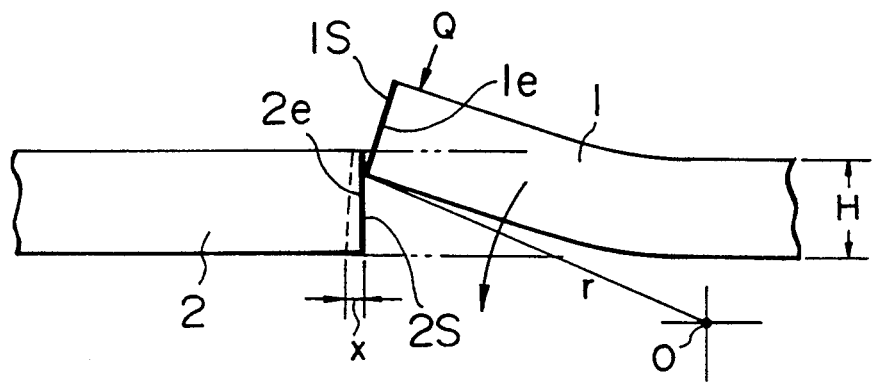
FIG. 3 is a diagram showing a method of joining hot strips according to a third embodiment of the present invention.

In the third embodiment shown in FIG. 3, one bar 1 is bent about a point O with a radius r before joining and the end face of the other bar is positioned to abut against the one bar 1, followed by applying the force Q to stretch the bent bar. By so doing, there also occur a relative slide, a compression force and a plastic deformation due to the wedge effect, thus providing the similar advantage. In this case, assuming that the maximum length of overlapped region between both the bars resulted when stretching the bent preceding bar 1 without considering any plastic deformation of the trailing end face 1e is x, the joining line is formed at a position of about x/2 and the amounts of plastic deformation of the leading end face 2e of the succeeding bar 2 and the trailing end face 1e of the preceding bar 1 are each approximately x/2 at maximum.

Figure 4:
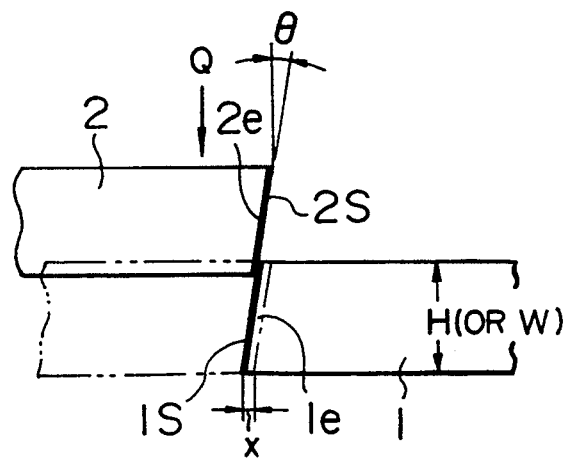
FIG. 4 is a diagram showing a method of joining hot strips according to a fourth embodiment of the present invention.

Furthermore, in the fourth embodiment shown in FIG. 4, the respective end faces 1e, 2e of the preceding bar 1 and the succeeding bar 2 are cut at their crops beforehand with an inclination of $\theta$ relative to the vertical direction, followed by vertically depressing the succeeding bar 2 by applying the force Q. By so doing, there also occur a relative slide, a compression force and a plastic deformation due to the wedge effect, thus enabling the preceding bar 1 and the succeeding bar 2 to be joined together. In this method, too, assuming that the horizontal shift between the lower edge of the leading end face 2e of the succeeding bar 2 and the lower edge of the trailing end face 1e of the preceding bar 1 before the depression is x, the joining line is formed at a position of about x/2 and the amounts of plastic deformation of the leading end face 2e of the succeeding bar 2 and the trailing end face 1e of the preceding bar 1 are each approximately x/2 at maximum.

The above embodiments are explained in connection with the case of joining bars to each other after rough-rolling and before finish-rolling. For slabs thicker than bars, the present invention is similarly applicable to join them by obliquely cutting end faces of slabs beforehand by a gas cutter in a continuous casting system.

Further, while the preceding bar 1 and the succeeding bar 2 are joined to each other in the above embodiments by setting the direction of slide of the end faces 1e, 2e, which become the mutually joined surfaces, to be aligned with a direction of the bar thickness H, the similar joining can also be achieved by sliding the bars in a direction of the bar width W or in both the directions of the bar thickness H and the bar width W. Particularly, in the embodiments of FIGS. 2 and 4, it is suitable to slide bars in the direction of the bar width W for joining them, as shown. In the case of sliding bars in the direction of the bar width W, because the slide stroke can be much larger than that in the case of sliding bars in the direction of the bar thickness H, the effect of descaling the oxide scales 1S, 2S is increased and so is the heat generated by friction and deformation due to the relative slide. Accordingly, those embodiments are especially useful in joining bars which are made of material having poor joining property or are at relatively low temperatures. However, those methods require the path centers of the bars 1, 2 to be shifted from each other and thus need an additional device for shifting the bars 1, 2. Also, the plane length of table rollers for transferring the bars must be widened correspondingly. In this point of view, therefore, the method of sliding bars in the direction of the bar thickness which will not entail the above disadvantages is more desirable.

In any of the above embodiments, by forming the upper and lower edges of the leading and trailing end faces of the bars 1, 2 into a rectangular or nearly rectangular shape, the edge of one bar 1 or 2 bites well into the confronting end face of the other bar so that not only the descaling effect but also the mutual compression effect of both the bars 1, 2 are increased to ensure more positive joining. For the foregoing reason, it is desirable that crop-cutting of the leading and trailing end faces of the bars 1, 2 before joining is made by a guillotine shear, a parallel link shear or a Bendjuram shear, in which upper and lower blades are vertically movable in parallel relation, so as to provide the right-angled cut surfaces.

Embodiments of Joining Apparatus

Embodiments of a joining apparatus of the present invention for practicing the above-mentioned joining method will be next described with reference to the drawings.

First Embodiment of Joining Apparatus

To begin with, a joining apparatus according to the first embodiment of the present invention will be explained with reference to FIGS. 5 and 6.

Figure 5:
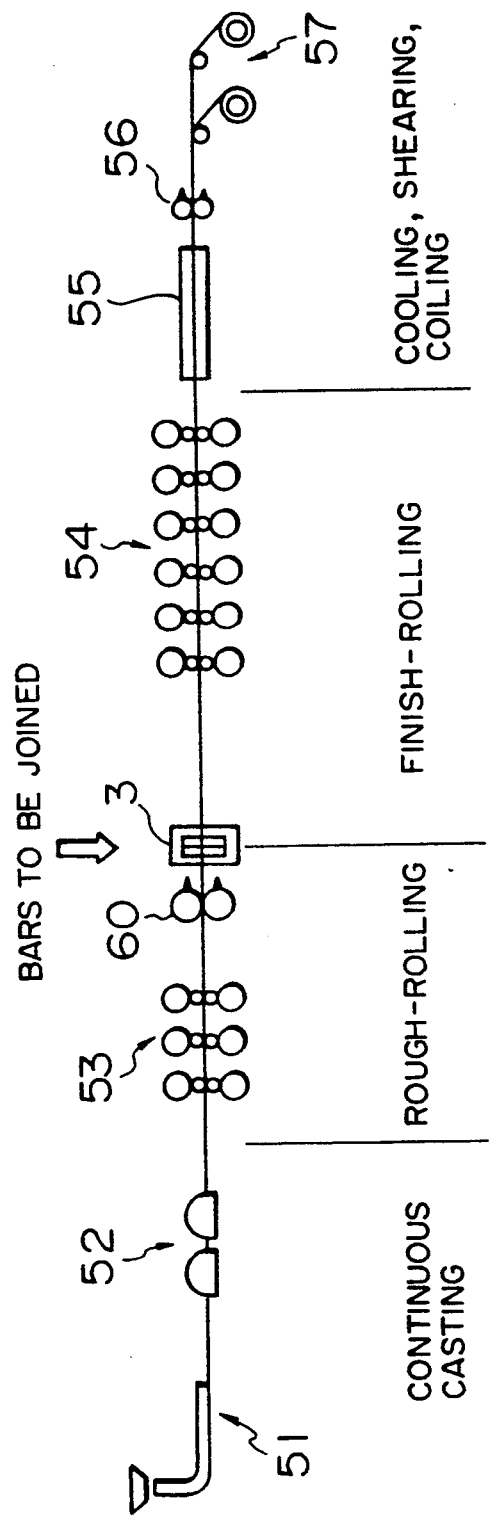
FIG. 5 is a schematic view of a continuous hot rolling mill system equipped with an apparatus for joining hot strips according to the present invention.
Figure 6:
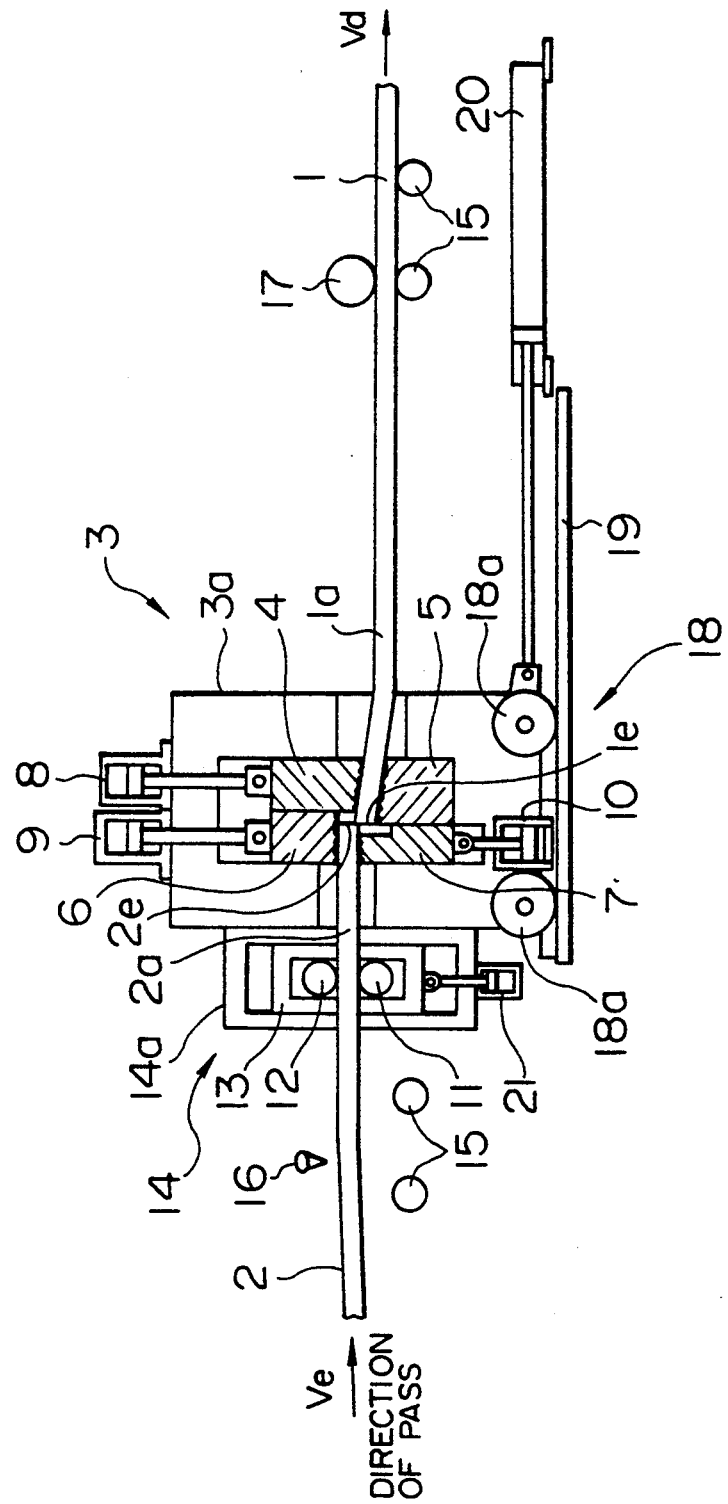
FIG. 6 is a partial sectional side view of an apparatus for joining hot strips according to the first embodiment of the present invention.

In FIG. 5, a continuous hot rolling mill system of this embodiment comprises a continuous casting machine 51, a heating furnace 52, a train of roughing mill stands (roughing train) 53, a shear 60, a joining machine 3, a train of finishing mill stands (finishing train) 54, a cooling furnace 55, a shear 56 and a coiler 57 which are arranged in this order. The continuous casting machine 51 produces a slab having a thickness of 120 to 300 mm and a width of 700 to 2000 mm. This slab is rolled by the roughing train 53 into a bar having a thickness of 30 to 50 mm and then rolled by the finishing train 54 into a sheet product having a thickness of 1 to 12 mm. The shear 60 is generally used to cut crops at the leading and trailing ends of a bar supplied to the finishing train 54 for easier biting of the cut ends. In this embodiment, the joining machine 3 is arranged between the shear 60 and the finishing train 54 and used to crop-cut the leading and trailing ends of each of bars to be joined together by the joining machine 3. The shear 56 is to cut the sheet product taken up by the coiler 57, thereby producing a product coil. FIG. 6 shows a structure of the joining machine 3. The joining machine 3 is constructed as an apparatus for practicing the joining method shown in FIG. 1. In FIG. 6, denoted by 1a is a trailing end of the preceding bar 1 being rolled by the finishing train 54 after rough-rolling, and 2a is a leading end of the succeeding bar 2 after having left the roughing train 53 and having been cut at its crop by the shear 60. The joining machine 3 has a body frame 3a in which there are disposed a pair of vertically spaced clamping metal dies 4, 5 and a pair of vertically spaced pressing metal dies 6, 7 for respectively clamping or holding the trailing and leading ends 2a, 1a of the bars 1, 2 therebetween.

The clamping metal dies 4, 5 serve to hold the trailing end 1a of the bar 1 therebetween in an inclined posture and also bear the force produced in the horizontal direction for the purpose of practicing the joining method shown in FIG. 1. The bar 1 is desirably formed on its surface with saw tooth-shaped ruggedness to effectively bear the horizontal force. This ruggedness also serves to prevent cooling of the bar ends. The upper metal die 4 is vertically movable by a hydraulic cylinder 8 and kept open while the bar is passing therethrough.

The pressing metal dies 6, 7 are vertically movable by hydraulic cylinders 9, 10, respectively. Of these two dies, the upper metal die 6 serves to apply a pressing force and the lower die 7 serves to hold the bar leading end in place and prevent the bar from escaping in the horizontal direction during the pressing.

On the inlet side of the body frame 3a, there is installed a position adjuster 14 for adjusting a vertical position of the leading end of the succeeding bar 2. The position adjuster 14 comprises a pair of pinch rollers 11, 12 and an inner housing 13 for accommodating the pinch rollers 11, 12 therein. The inner housing 13 is vertically movable in an outer housing 14a by a hydraulic cylinder 21 to adjust a vertical position of the leading end of the succeeding bar 2 being held between the pinch rollers 11 and 12.

Denoted by 15 is a table roller. Taking into account the case where bars are not to be joined, the table rollers 15 are positioned at the same level on both upstream and downstream sides of the joining machine and also at the same level as a system equipped with no joining machine. Therefore, the inlet-side table rollers 15 are lower than the level at which the bar 2 is held between the metal dies 6 and 7. The above position adjuster 14 is used to move the bar 2 up to the level required during the joining. Note that in a system exclusively employed to join bars, the position adjuster 14 can be dispensed with by installing the inlet-side table rollers 15 at such a level as allowing the metal dies 6, 7 to hold the bar 2 therebetween.

A position sensor 16 for detecting passage of the leading end or trailing end of the bars 1, 2 is installed on the inlet side of the joining machine 3, and a measuring roller 17 for detecting a travel speed of the bar is installed on the outlet side of the joining machine 3. The positions of the respective ends of the bars 1, 2 can be known in combination of the position sensor 16 and the measuring roller 17.

The joining machine 3 is able to travel by a transfer device 18 in the direction of travel of the bars. The transfer device 18 has traveling wheels 18a mounted to the body frame 3a and the traveling wheels 18a are driven by a hydraulic cylinder 20 to reciprocate the joining machine 3 on rails 19.

Operation of the above joining apparatus will be next explained.

While the preceding bar 1 is passing the joining machine 3, the upper metal dies 4, 6 are at open positions higher than the illustrated positions, whereas the lower metal die 7 is standing on at the illustrated position. When the trailing end 1a of the preceding bar 1 passes the position sensor 16, the position of the trailing end 1a of the preceding bar 1 is calculated with the aid of the measuring roller. At the time the trailing end face 1e of the preceding bar 1 reaches a position in short of the clamping metal dies 4, 5, the hydraulic cylinder 8 is actuated to hold the trailing end 1a of the preceding bar 1 between the clamping metal dies 4 and 5. On this occasion, the trailing end 1a of the preceding bar 1 is bent upon clamping by the metal dies 4, 5 such that the trailing end face 1e has a predetermined angle with respect to the vertical direction (see FIG. 1). Immediately before clamping of the metal dies 4, 5, the joining machine 3 is accelerated by driving the hydraulic cylinder 20 up to a speed substantially equal to the speed Vd of the bar 1. This is achieved by controlling the position draulic cylinder 20 so as to keep constant the relative relationship between the calculated position of the trailing end 1a of the bar 1 and the position of the joining machine 3 with the aid of a position sensor (not shown) which is installed somewhere in the direction of travel of the joining machine 3.

The succeeding bar 2 is fed in succession to the preceding bar 1 and its leading end face 2e is detected by the position sensor 16. When the leading end of the bar 2 has passed the pinch rollers 11, 12, the succeeding bar 2 is lifted by the hydraulic cylinder 21 up to a predetermined level and the end faces 1e, 2e at the trailing and leading ends 1a, 2a of the bars 1, 2 contact with each other such that the lower edge of the end face 2e abuts against the end face 1e in an offset condition as shown. The contact therebetween can be confirmed by utilizing a change in current of a drive motor for the pinch rollers 11, 12 or a combination of the speed Ve of the succeeding bar 2 and the position sensor 16. As soon as the contact is confirmed, the hydraulic cylinder 9 is actuated to push down the upper metal die 6 to press the joined surfaces of the bars until the offset between the end face 2e of the succeeding bar 2 and the end face 1e of the preceding bar 1 disappears. At this time, the cylinder 10 is pushed down under a constant pressure. It is thus possible to, as explained above, momentarily crash and remove the oxide scales on both the end faces 1e, 2e which become the joined surfaces, as well as to join both the bars 1, 2 together under the large compression force and plastic deformation due to the wedge effect at the joined surfaces.

As soon as the stroke of the cylinder 9 reaches a predetermined value, the pistons of the hydraulic cylinders 8, 9 are raised and the piston of the cylinder 10 is lowered, thereby moving the metal dies 4, 6, 7 away from the bars 1, 2, following which the joining machine 3 is returned by the hydraulic machine 20 to the original position. Also, the inner housing 13 is lowered to be ready for joining a bar.

Second Embodiment of Joining Apparatus

Figure 7:
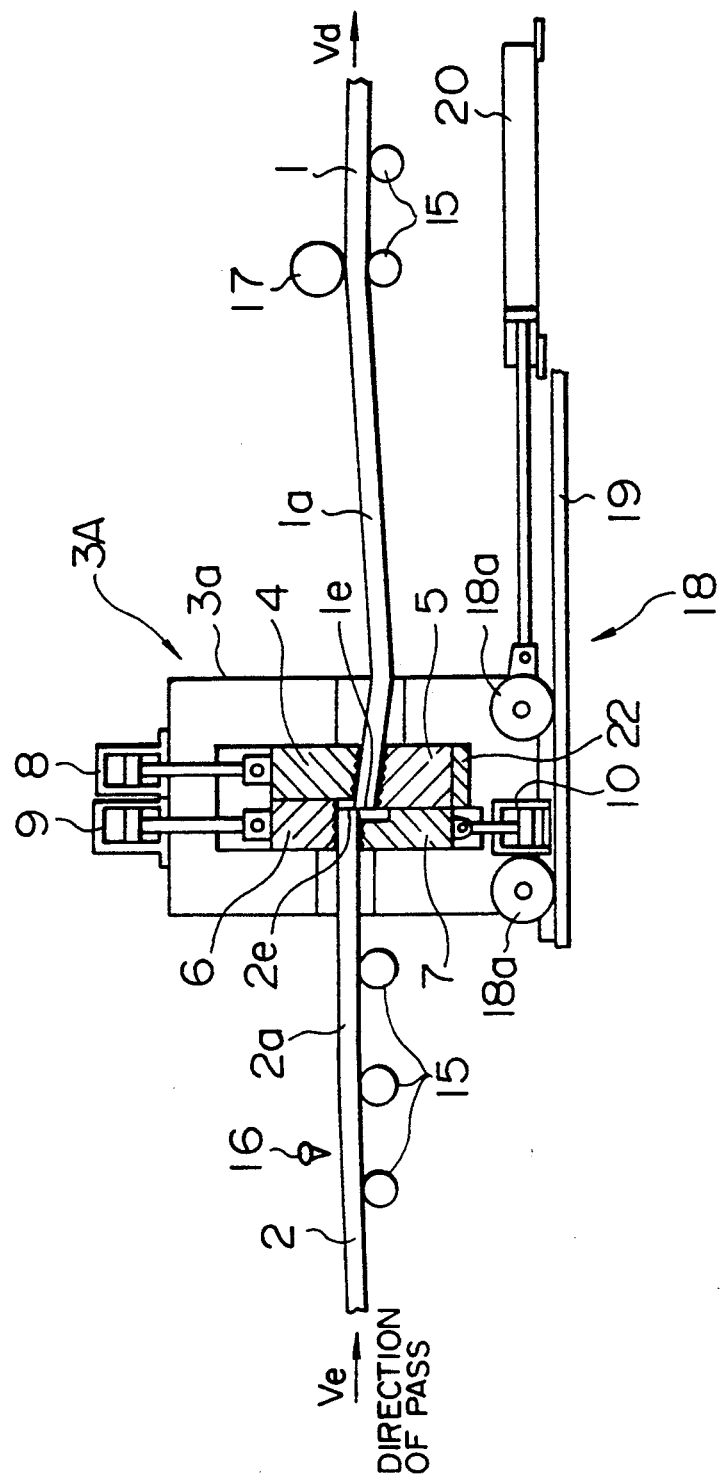
FIG. 7 is a partial sectional side view of an apparatus for joining hot strips according to the second embodiment of the present invention.

A joining apparatus according to the second embodiment of the present invention will be explained with reference to FIG. 7. In this embodiment, while the joining principles are the same as those in the embodiment of FIG. 6, the position adjuster 14 can be dispensed with for simplifying the structure and operation. In FIG. 7, identical members to those in FIG. 6 are denoted by the same reference numerals.

Referring to FIG. 7, the upper surface of the pressing lower metal die 7 is positioned at almost the same level as the table rollers so that the leading end 2a of the succeeding bar 2 is not required to be changed in its level at the time of the joining. On the other hand, the upper surface of the clamping lower metal die 5 is positioned to be lower than the level of the table rollers so that when clamping the preceding bar 1 by the clamping metal dies 4, 5, the end face 1e of the trailing end 1a is inclined and, at the same time, the vertical position of the end face 1e is lowered by a required amount. The amount by which the bar 1 is lowered must be increased with the bar having a larger thickness. Therefore, a wedge piece 22 is provided in such a manner as able to move in a direction normal to the drawing sheet for adjusting the upper surface level of the metal die 5 depending on a thickness of the bar.

In the thus-arranged joining machine 3A of this embodiment, the preceding bar 1 is fed into the joining machine 3A while contacting the leading end face 2e of the succeeding bar 2 with the trailing end face 1e of the preceding bar 1. At the time the trailing end face 1e of the preceding bar 1 reaches the position of the clamping metal dies 4, 5, the upper metal die 4 is descended to clamp the preceding bar 1 and, simultaneously, the pressing metal die 6 is descended. Upon clamping by the upper metal die 4, the trailing end face 1e of the preceding bar 1 is inclined and also pressed downwardly. The descent of the pressing metal die 6 causes the leading end of the succeeding bar 2 to bite into the end face 1e of the bar 1 while crashing and removing the oxide scale on the end face 1e, and further causes both the bars to be compressed and joined together by the pressing and plastic deformation due to the wedge effect. Additionally, the joining machine 3A is moved by the hydraulic cylinder 20 in synchronism with the bar immediately before the clamping and then returned to the original position after opening the metal dies.

With this embodiment, since there is no need of adjusting the level of the bar 2 on the inlet side of the joining machine 3A, the succeeding bar 2 can be fed into the joining machine 3A by setting the speed of the table rollers 15 higher than Vd determined by the finish-rolling speed so as to slide the bar 2 over the table rollers 15, while contacting the leading end face 2e of the succeeding bar 2 with the trailing end face 1e of the preceding bar 1. As a result, the operation of joining the bars 1, 2 to each other can be simplified and completed in a shorter period of time.

Third Embodiment of Joining Apparatus

Figure 8:
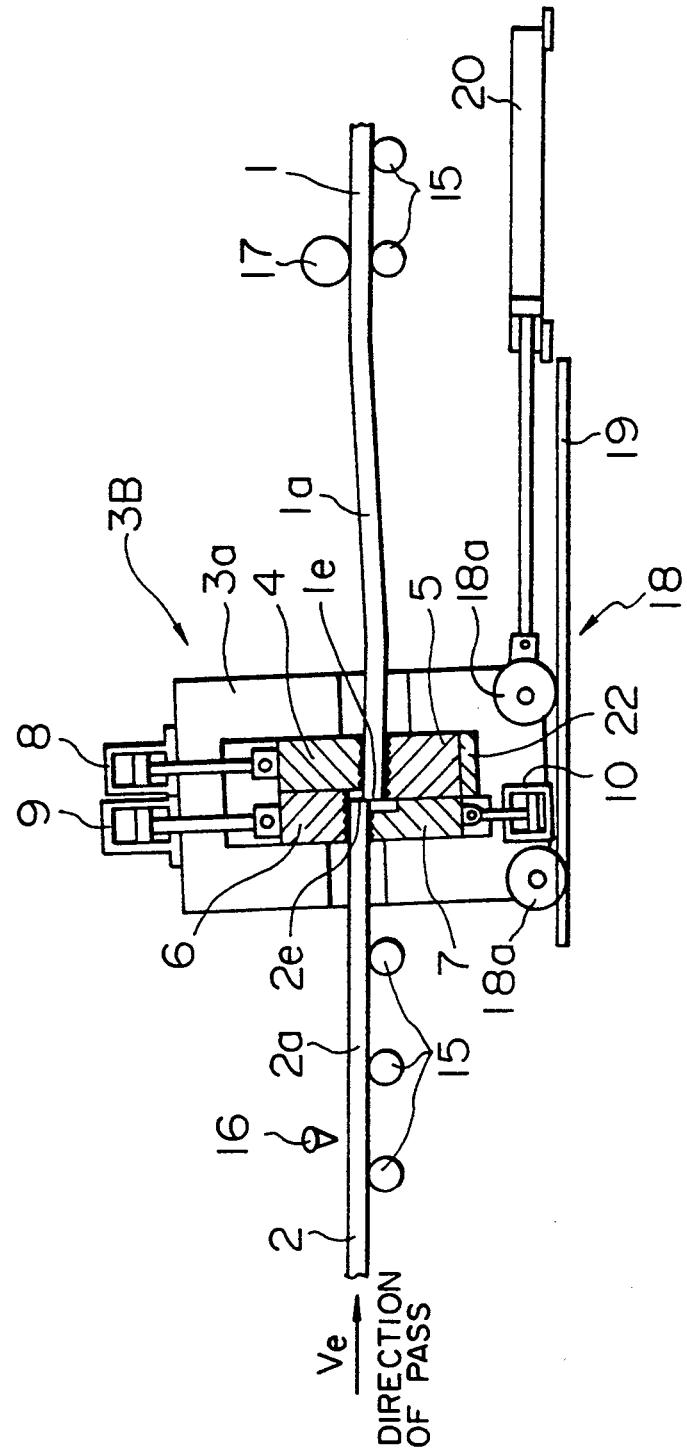
FIG. 8 is a partial sectional side view of an apparatus for joining hot strips according to the third embodiment of the present invention.

A joining apparatus according to the third embodiment of the present invention will be explained with reference to FIG. 8. In FIG. 8, identical members to those in FIG. 6 are denoted by the same reference numerals. A joining machine 3B of this embodiment is constituted as an apparatus for practicing the joining method of FIG. 2. More specifically, in this embodiment, a body frame 3a of the joining machine 3 is inclined rather than inclining the ends of the bars 1, 2. In addition, the clamping metal dies 4, 5 and the clamping metal dies 6, 7 have their surfaces extending in the horizontal direction, and the direction of movement of the pressing metal dies 6, 7 is inclined with respect to the bar end face. With such an arrangement, the joining method shown in FIG. 2 is practiced to join the bars 1, 2 together.

Fourth Embodiment of Joining Apparatus

A joining apparatus according to the fourth embodiment of the present invention will be explained with reference to FIGS. 9 to 16.

Figure 9:
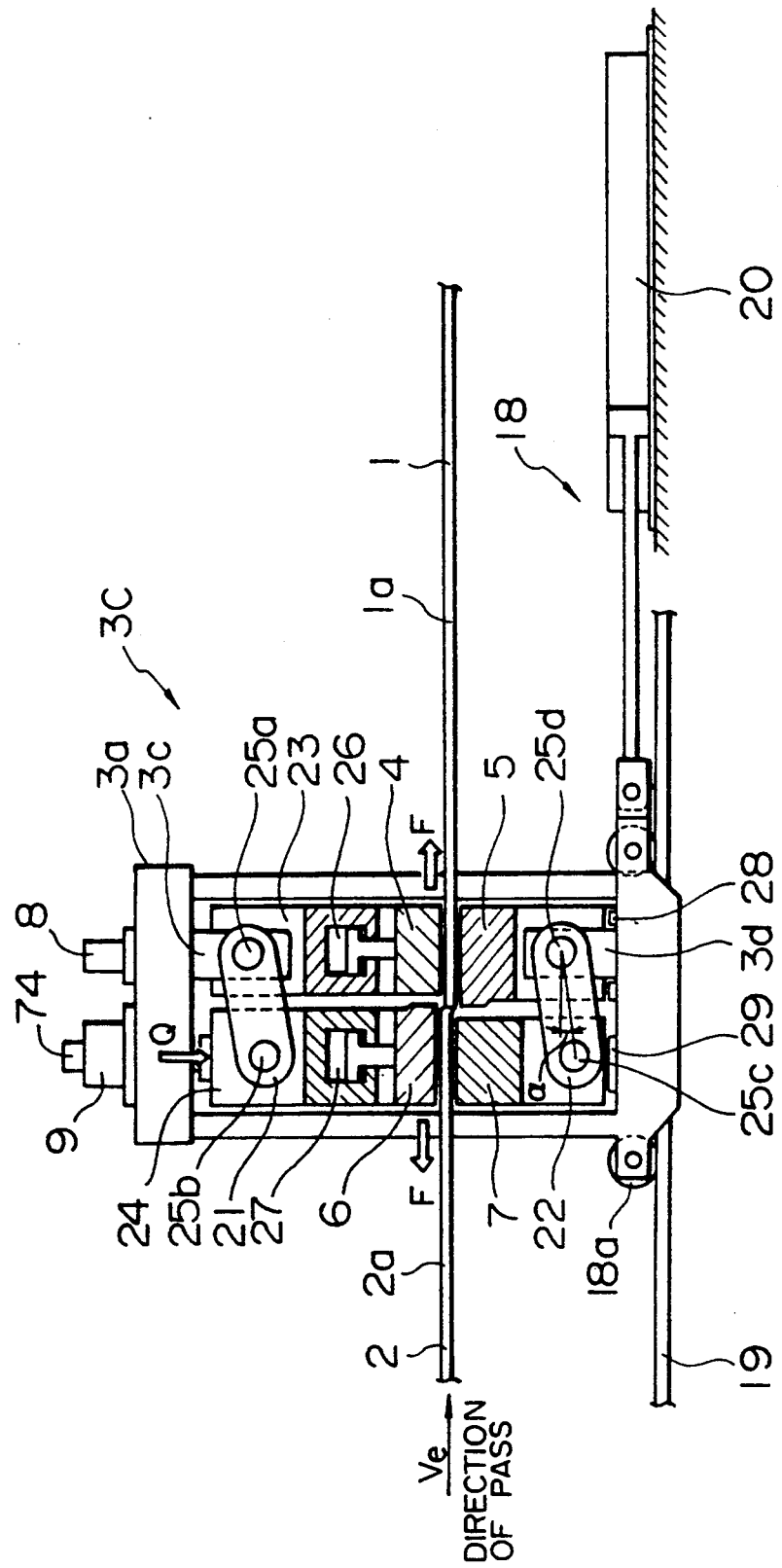
FIG. 9 is a partial sectional side view of an apparatus for joining hot strips according to the fourth embodiment of the present invention.

In FIG. 9, the joining machine 3C of this embodiment has a body frame 3a as a joining machine body in which there are disposed a pair of vertically spaced clamping metal dies 4, 5 and a pair of vertically spaced pressing metal dies 6, 7 for respectively holding trailing and leading ends 2a, 1a of bars 1, 2 therebetween.

Figure 10:
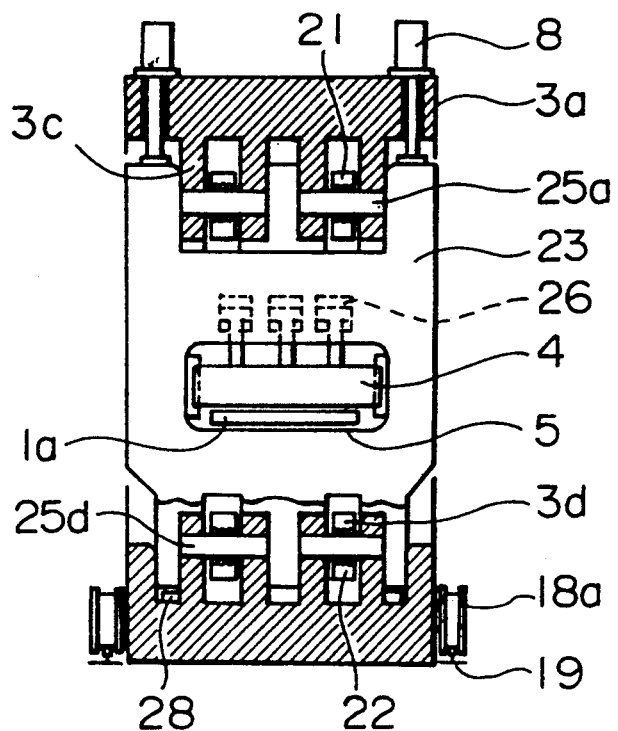
FIG. 10 is a partial sectional front view of the joining apparatus shown in FIG. 9 as viewed from the right side on the drawing.
Figure 11:
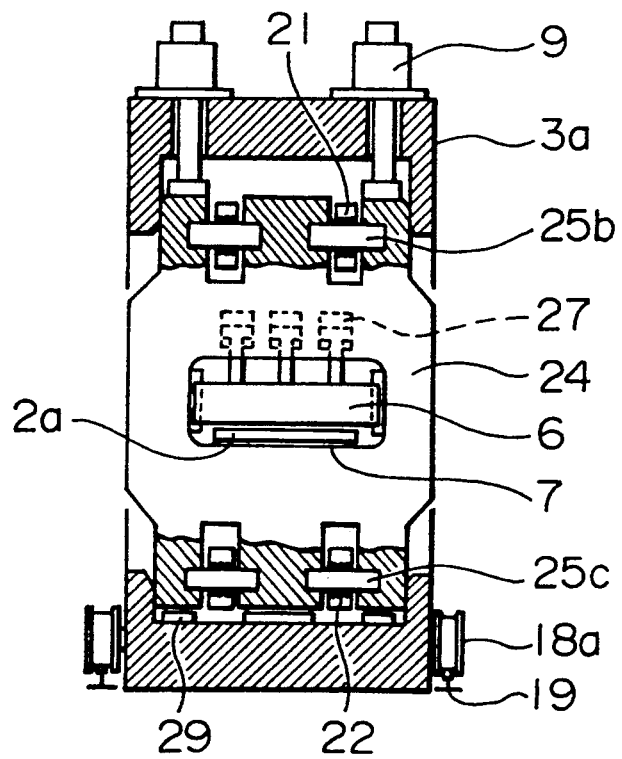
FIG. 11 is a partial sectional rear view of the joining apparatus shown in FIG. 9 as viewed from the left side on the drawing.

The joining machine 3C of this embodiment also has a first metal die frame 23 and a second metal die frame 24 in the body frame 3a. In the first metal die frame 23, the clamping lower metal die 5 is provided integrally therewith and, as shown in FIG. 10, the clamping upper metal die 4 is coupled thereto to be vertically movable by a plurality of hydraulic cylinders 26. Likewise, in the second metal die frame 24, the pressing lower metal die 7 is provided integrally therewith and, as shown in FIG. 11, the pressing upper metal die 6 is coupled thereto to be vertically movable by a plurality of hydraulic cylinders 27. Upper and lower frames of the body frame 3a are provided with upper and lower brackets 3c, 3d, respectively, and the metal die frame 23 is supported at the upper and lower brackets 3c, 3d in such a manner to be able to vertically move by a plurality of hydraulic cylinders 8. The metal die frame 24 is supported in such a manner to be able to vertically move by a plurality of hydraulic cylinders 9. Further, two pairs of upper and lower links 21, 22, each having an inclination angle of α, have their one ends coupled to the upper and lower brackets 3c, 3d by joint pins 25a, 25d, and the other ends coupled to the second metal die frame 24 by joint pins 25b, 25c. The upper and lower brackets 3c, the links 21, 22, the joint pins 25a to 25d and the second metal die frame 24 jointly constitute a quadrilateral link to operatively couple the first and second metal die frames 23, 24 with each other. A lower limit of the first metal die frame 23 is given by a stopper 28 and a lower limit of the second metal die frame 24 is given by a stopper 29.

Of the clamping metal dies 4, 5 and the pressing metal dies 6, 7, the clamping lower metal die 5 has a length sufficient to support both the trailing end 1a of the preceding bar 1 and a part of the leading end 2a of the succeeding bar 2, while the pressing upper metal die 6 has a length sufficient to support both the leading end 2a of the succeeding bar 2 and a part of the trailing end 1a of the preceding bar 1. Correspondingly, the other metal dies 4 and 7 are shortened to lengths sufficient to support the remaining part of the trailing end 1a of the preceding bar 1 and the remaining part of the leading end 2a of the succeeding bar 2, respectively.

The joining machine 3c also includes a transfer 18. The transfer device 18 has traveling wheels 18a mounted to the body frame 3a and the traveling wheels 18a are driven by a hydraulic cylinder 20 to reciprocate the joining machine 3C on rails 19 in the direction of the path of the bars. The joining machine 3C is accelerated by the transfer device 18 up to a speed substantially equal to the speed Ve of the bar 1, and the bars 1, 2 are joined to each other while the joining machine is traveling.

Figure 12:
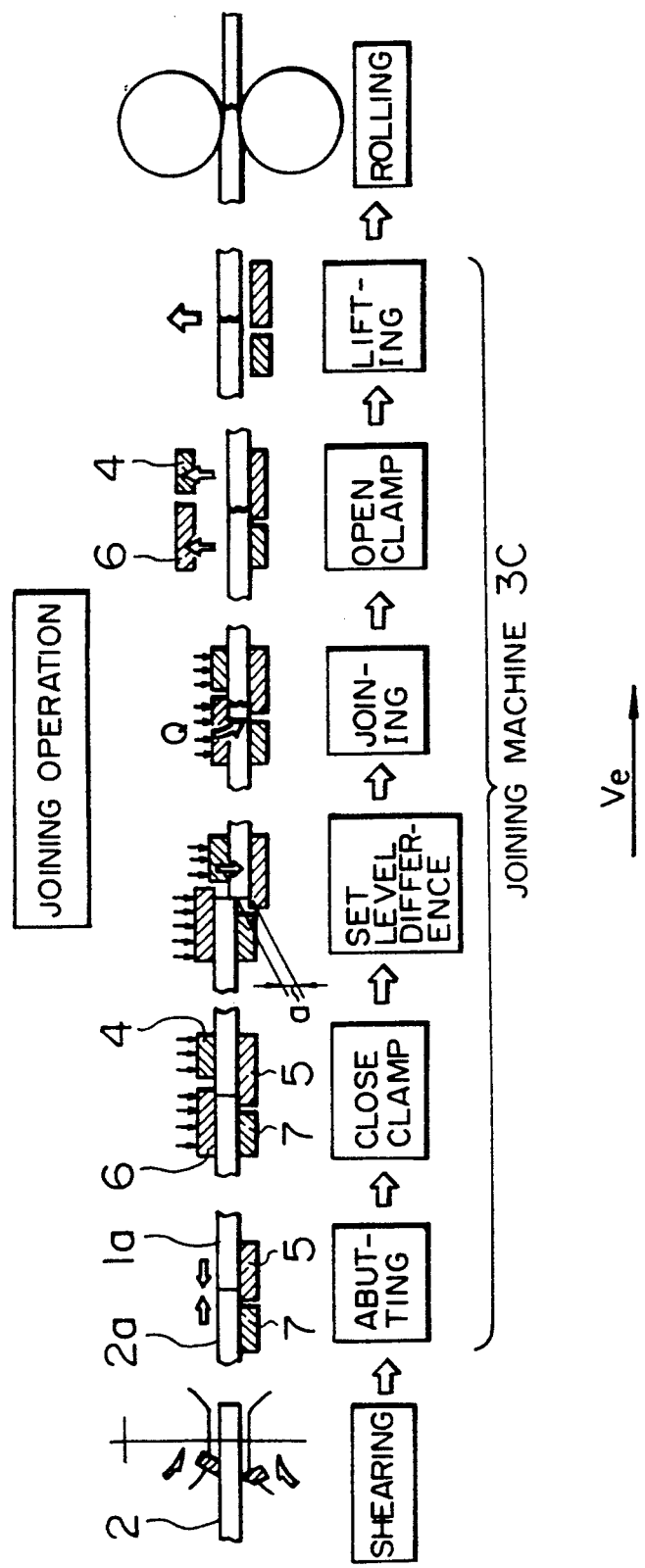
FIG. 12 is a diagram showing procedures of joining operation carried by the joining apparatus shown in FIG. 9.

Joining operations carried out by the joining machine 3C will be explained with reference to FIG. 12. First, the trailing end 1a of the preceding bar 1 and the leading end 1e of the succeeding bar 2 are each sheared by the shear 60 (see FIG. 5) disposed immediately before the joining machine 3C. The joining machine 3C is accelerated by the transfer device 18 up to a speed substantially equal to the speed Ve of the preceding bar 1 for joining the bars 1, 2 together while traveling. The end faces of the bars 1, 2 are abutted against each other at a predetermined position above the clamping lower metal mold 5. Then, the cylinders 26, 27 are actuated to depress both the clamping upper metal die 4 and the pressing upper metal die 6 to thereby close the clamp. Then, the cylinders 8 are actuated to depress the first metal die frame 23 to thereby set a level difference a in the direction of bar thickness between the end face of the preceding bar 1 and the end face of the succeeding bar 2. Then, the cylinder 9 is actuated to depress the second metal die frame 24 under application of a force Q by a distance almost equal to the level difference a for joining the bars 1, 2 together. Then, the cylinders 26, 27 are actuated to raise the metal dies 4, 6 for opening the clamp. Then, the bars joined together are lifted from the upper surfaces of the metal dies 5, 7 by a device (not shown) for lifting the bars, and fed to rolling mill stands on the downstream side. As soon as a series of joining procedures are completed, the joining machine 3C is returned by the transfer device 18 to be ready for joining a next bar.

During the joining step in the above joining operation, the second metal die frame 24 is depressed by the cylinder 9 through a predetermined stroke, whereby the pressing metal dies 6, 7 are moved under actions of the links 21, 22 in an oblique direction toward the clamping metal dies 4, 5. This causes a relative slide between the end face surface of the trailing end 1a of the preceding bar 1 and the end face surface of the leading end 2a of the succeeding bar 2, and also produces a horizontal pressing force between the surfaces of the end faces of the bars 1 and 2 due to the wedge effect so that both the end faces are pressed to exhibit a plastic deformation, thus bringing about a state suitable for the joining. Through the pressing along with the relative slide between the surfaces of both the end faces and the plastic deformation, the oxide scales on the end faces of both the bars 1, 2 are peeled off to expose the metal surface of the material and, at the same time, the exposed metal surfaces are compressed with each other to positively join both the bars 1, 2 together in a short time.

On the other hand, the horizontal force F produced by the wedge effect is borne by the links 21, 22 and the joint pins 25a, 25b, 25c, 25d and thus will not act on the vertically movable members in the body frame 3.

Figure 13A:
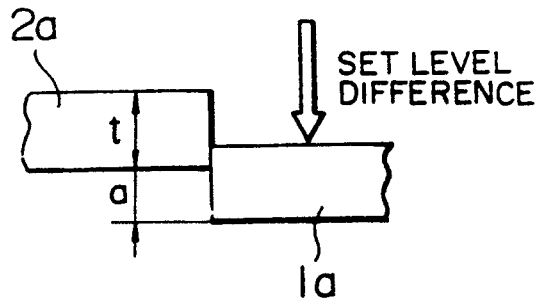
FIGS. 13(A) and 13(B) diagrammatically show details of a level difference setting step and a joining step in the procedures of joining operation shown in FIG. 12, FIGS. 13(A) and 13(B) of the drawing respectively showing the level difference setting step and the joining step.
Figure 13B:
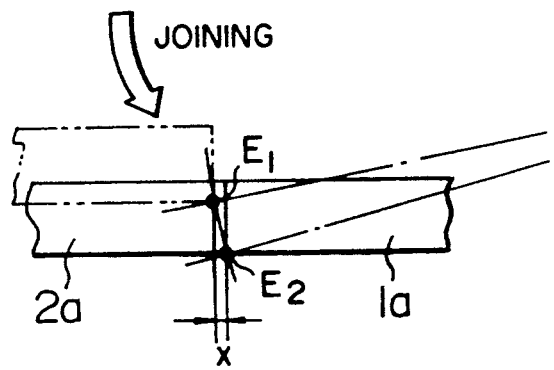

FIGS. 13(A) and 13(B) show the level difference setting step and the joining step in more detail. By depressing the first metal frame 23 through a predetermined stroke by the cylinder 8, the trailing end 1a of the bar 1 held between the clamping metal dies 4 and 5 is offset to make the level difference a in the direction of the thickness t of the leading end 2a of the bar 2 held between the pressing metal dies 6 and 7. Then, by depressing the second metal frame 24 through a predetermined stroke by the cylinder 9, the leading end 2a of the bar 2 held between the pressing metal dies 6 and 7 is moved in an oblique direction toward the end face of the bar 1 so that both the end faces of the bars are slid relative to each other and joined together while being pressed to exhibit the plastic deformation. Assuming now that the length compressed at both the ends in the direction of the bar length during the joining step under pressing is x, the joining line is formed at a position of about x/2 and x represents an amount of the plastic deformation, i.e., an amount of the compression, which contributes to the joining. The compression amount x has an optimum value depending on the thickness t of the bar and requires to be increased at the larger thickness of the bar.

Figure 14:
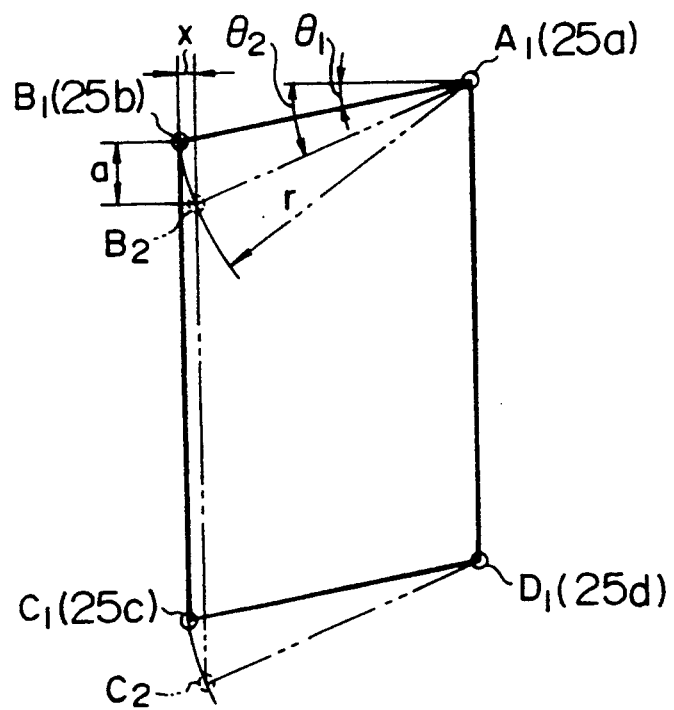
FIG. 14 is an explanatory diagram of a link mechanism in the joining apparatus shown in FIG. 9.

The action of the link mechanism in the above joining step will be explained with reference to FIG. 14. The first metal die frame 23 and the second metal die frame 24 are arranged to constitute a quadrilateral link by the links 21, 22 and the joint pins 25a to 25d. In FIG. 14, positions of the joint pins (fulcrums) of the quadrilateral link are indicated by $A_1$, $B_1$, $C_1$, $D_1$, and positions of the joint pins of the quadrilateral link as given when the second metal die frame 24 is depressed through the amount of level difference a to obtain the amount of compression x of the bars 1, 2 are indicated by $A_1$, $B_2$, $C_2$, $D_1$. When the quadrilateral link $A_1$, $B_1$, $C_1$, $D_1$ forms a parallelogram, the amount of level difference a is determined by the following equation (1) and the amount of compression x is determined by the following equation (2):

$$a = r(\sin\theta_2 - \sin\theta_1) \quad (1)$$
$$x = r(\cos\theta_1 - \cos\theta_2)$$
$$\phantom{x} = a(\cos\theta_1 - \cos\theta_2)/(\sin\theta_2 - \sin\theta_1) \quad (2)$$

where $\theta_1$: angle of inclination between the link $A_1B_1$ and the link $C_1D_1$ after setting the level difference;

$\theta_2$: angle of inclination between the link $A_1B_2$ and the link $C_2D_1$ after completion of the joining;

r: effective length of the links 21, 22.

Figure 15:
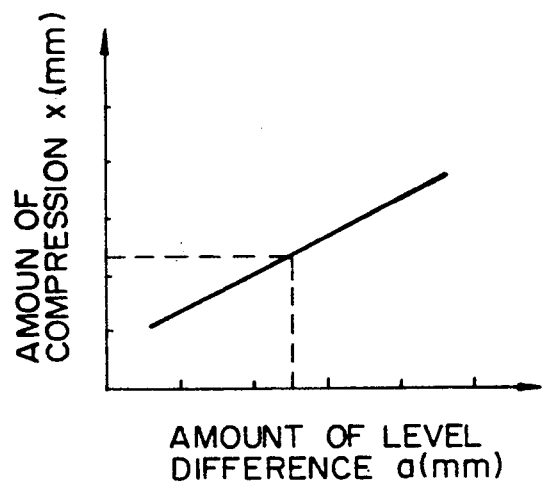
FIG. 15 is a graph showing the relationship between an amount of level difference a and an amount of compression x in the link mechanism shown in FIG. 14.

FIG. 15 shows the relationship between the amount of level difference a and the amount of compression x in accordance with the equation (2). As will be seen from the graph of FIG. 15, the amount of compression x optimum for the thickness t of the bar can be obtained by adjusting the amount of level difference a.

Figure 16A:
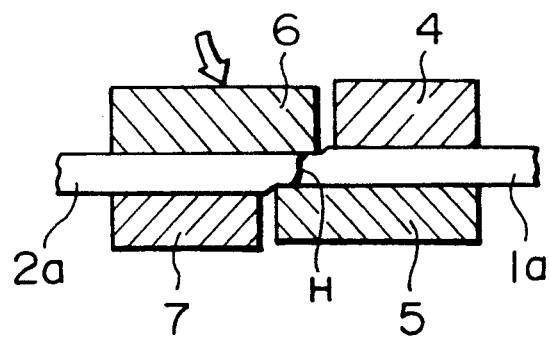
FIGS. 16(A) and 16(B) diagrammatically show an effect resulted from shapes of metal dies in the joining apparatus shown in FIG. 9, FIGS. 16(A) and 16(B) respectively showing a joined state according to the fourth embodiment and a joined state in the case of not adopting the die shapes of the fourth embodiment for comparison.
Figure 16B:
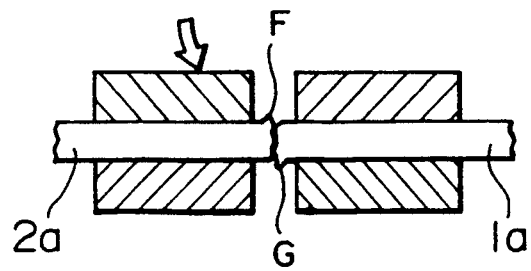
Figure 18:
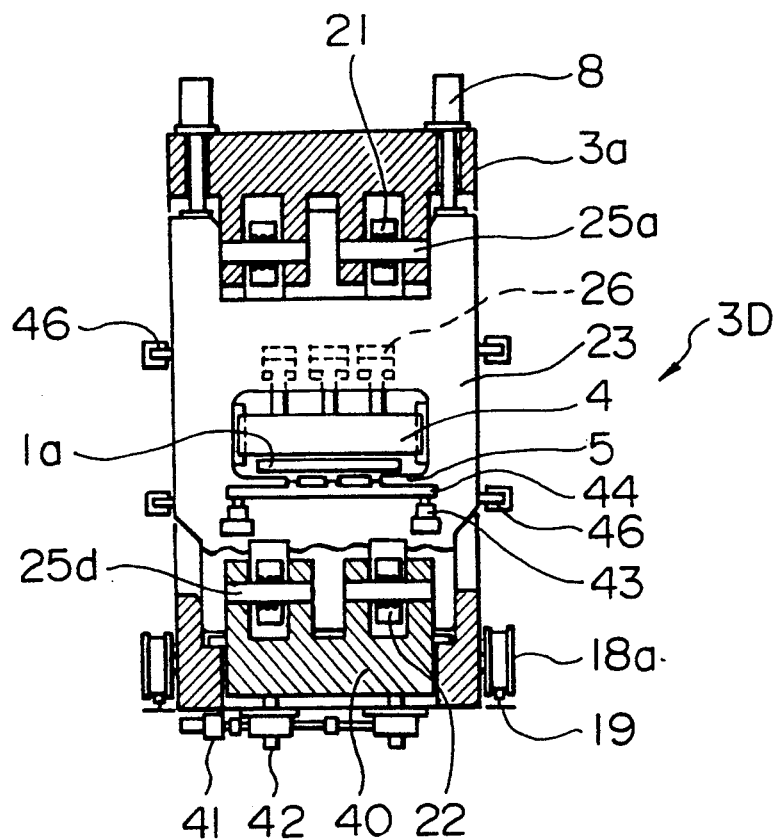
FIG. 18 is a partial sectional front view of the joining apparatus shown in FIG. 17 as viewed from the right side on the drawing.

Actions based on configurational features of the clamping metal dies 4, 5 and the pressing metal dies 6, 7 in this embodiment will be explained with reference to FIGS. 16(A) 16(B) When joining bars to each other and continuously rolling them by a finishing train, back-up is required in the actual operation to prevent separation of the joined surfaces until the joined bars are brought into the rolling mill stand. In this embodiment, as stated above, the lengths of the clamping lower metal die 5 and the pressing upper metal die 6 are sufficient to support both the trailing end 1a of the preceding bar 1 and a part of the leading end 2a of the succeeding bar 2 and both the leading end 2a of the succeeding bar 2 and a part of the trailing end 1a of the preceding bar 1, respectively, thus providing an overhang structure. By so doing, the metal dies 5, 6 abut against the bars 1, 2 on both sides of the joining line H during the joining of the bars 1, 2 as shown in FIG. 16(A), to thereby prevent swellings F, G at the end faces of the bars which would be otherwise produced as shown in FIG. 16(B). Further, the test conducted by the inventors has proved that the joining line in the direction of thickness of the bar is curved as indicated by H and, therefore, the joining strength is also increased.

With this embodiment thus arranged, since the horizontal force F generated due to the wedge effect during the pressing is borne by the links 21, 22 and the joint pins 25a to 25d, any strong force will not act on the body frame 3a of the joining machine 3 and the apparatus size can be reduced. Another advantage is that since no mechanically sliding portions are present between the first and second metal die frames 23, 24 and the body frame 3a during the pressing and the frames 23, 24 are supported by the joint pins 25a to 25d, the mechanical loss becomes small and the output of the cylinder 9 can be reduced.

Also, by adjusting the amount of level difference a between the preceding bar and the succeeding bar in the direction of bar thickness, the amount of compression x optimum for the thickness t of the bar can be obtained.

Furthermore, since the clamping lower metal die 5 and the pressing upper metal die 6 are formed into the overhang structure, the joined ends can be prevented from swelling and the joining line in the direction of the bar thickness is curved so that the joined interface between the bars may be given with the joining force enough to remain not apart from each other during the subsequent feeding and rolling steps.

Fifth Embodiment of Joining Apparatus

A fifth embodiment of the present invention will be explained with reference to FIGS. 17 to 24. In these drawings, identical members to those in the embodiment of FIG. 9 are denoted by the same reference numerals.

Referring to FIGS. 1A and 1B, in a joining machine 3D of this embodiment, a first metal die frame 23 and a second metal die frame 24 are arranged to constitute a quadrilateral link by links 21, 22 and joint pins 25a to 25d as with the fourth embodiment. In this embodiment, however, a lower bracket 25d to which the joint pin 3d is attached is constructed as a part of a vertically movable frame 40. The movable frame 40 is moved up and down by a combination of a motor 40 and a worm speed reducer 40 for adjusting a position of the joint pin 25d.

Figure 19:
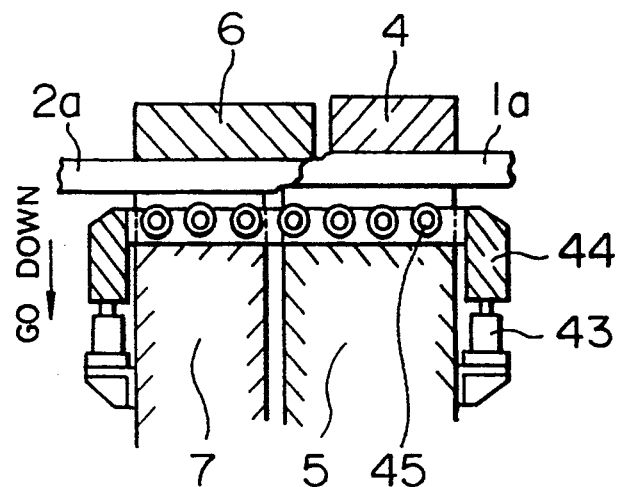
FIG. 19 is a view showing a bar lifting member, descended to a down-position, of the joining apparatus shown in FIG. 17.
Figure 20:
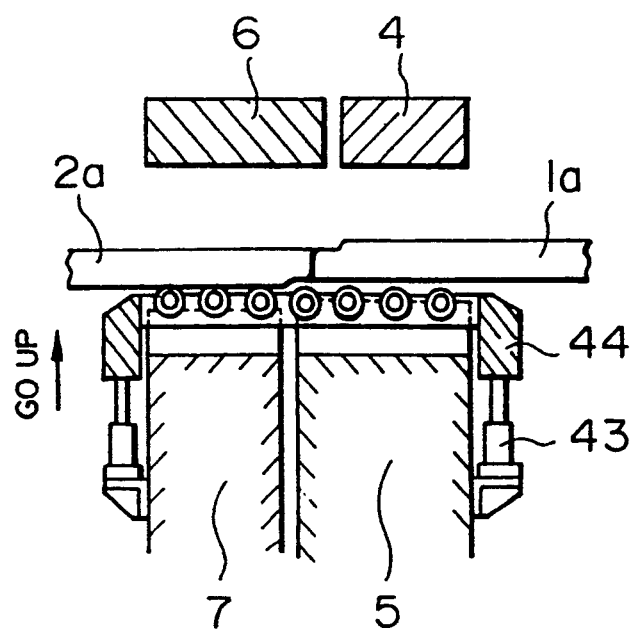
FIG. 20 is a view showing a bar lifting member, ascended to an up-position, of the joining apparatus shown in FIG. 17.
Figure 21:
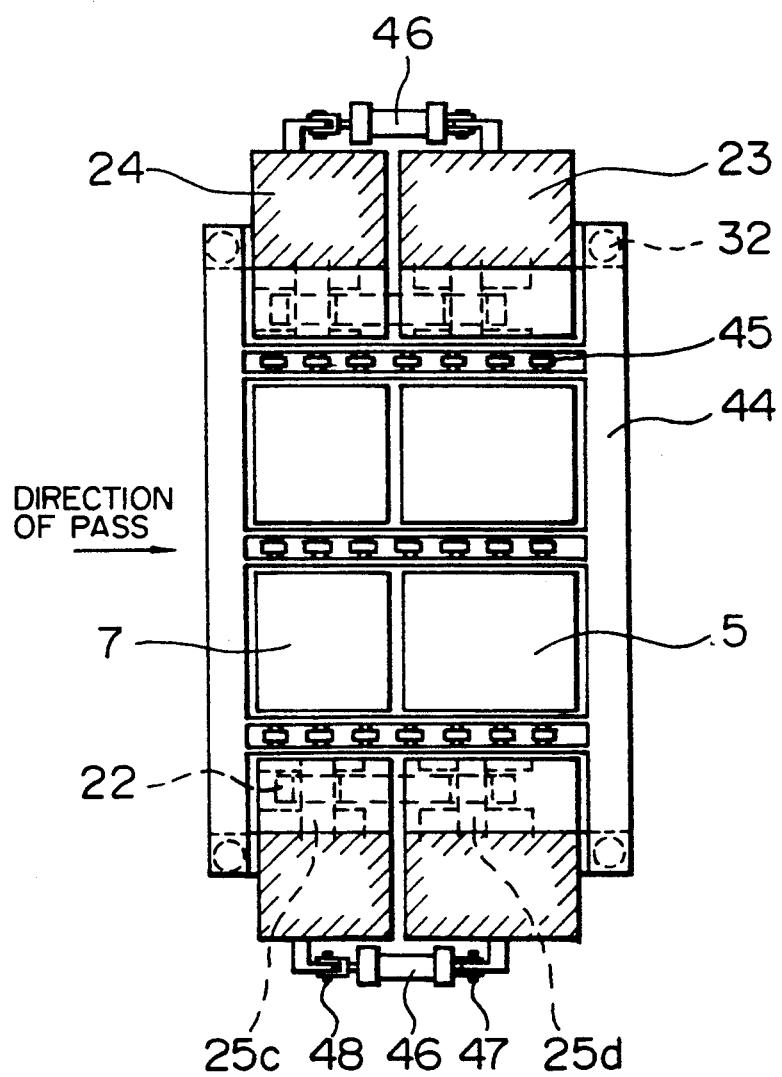
FIG. 21 is a sectional view taken along line XXI—XXI in FIG. 17.

Further, as shown in FIGS. 19 to 21, a bar lifting member 44 is incorporated in the upper surfaces of the lower metal dies 5, 7 to be vertically movable by a plurality of hydraulic cylinders 43. The bar lifting member 44 is provided with a plurality of guide rolls 45 to smooth feed of the bars. The bar lifting member 4 is standing on at a position below the upper surfaces of the lower metal dies 5, 7 during joining the bars and, as soon as the upper metal dies 4, 6 are raised after completion of the joining, the bar lifting member 4 is raised to lift the bars 1, 2 from the upper surfaces of the lower metal dies 5, 7. The bar lifting member 44 is effective particularly when using those metal dies which have jagged die surfaces, because the joined ends of the bars are likely to bite into the surfaces of the metal dies and become hard to separate from the metal dies.

Moreover, as shown in FIG. 21, the first metal die frame 23 and the second metal die frame 24 are coupled with each other by a plurality of hydraulic cylinders 46 and pins 47, 48. The hydraulic cylinders 46 serve to apply an extra pressure in a direction of the load acting on the links 21, 22, thereby absorbing a backlash or play of the link mechanism constituted by the links 21, 22 and the joint pints $25a$ to $25d$.

Operation of the link mechanism in this embodiment will now be explained with reference to FIGS. 22 to 24.

Figure 22:
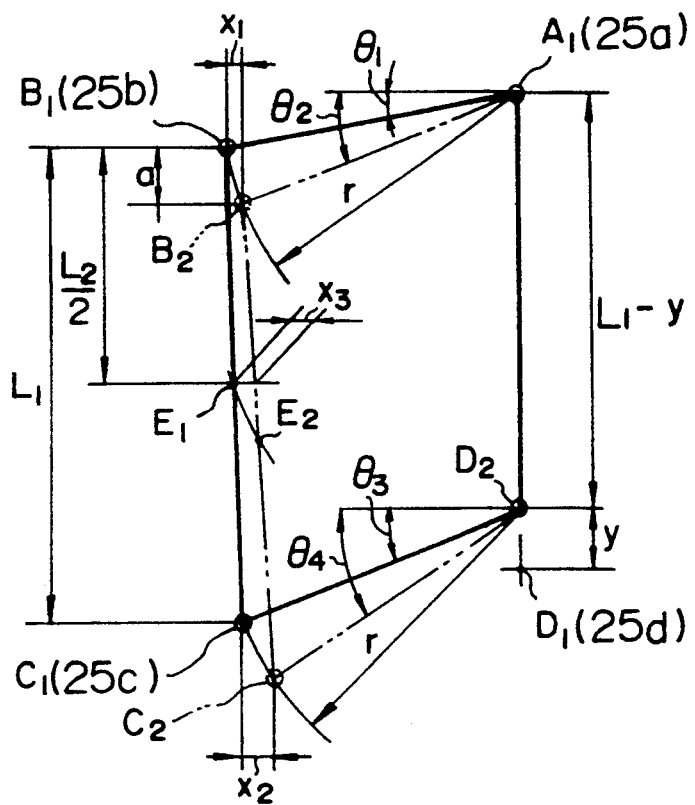
FIG. 22 is an explanatory diagram of a link mechanism in the joining apparatus shown in FIG. 17.

In FIG. 22, the quadrilateral link constituted by the joint pins $25a$ to $25d$ when the joint pin $25d$ is displaced upwardly by y from a reference position $D_1$ is indicated by $A_1$, $B_1$, $C_1$, $D_2$, and the quadrilateral link as given when the first metal die frame 23 is depressed from that state through the amount of level difference a to obtain the amount of compression x3 of the bars 1, 2 is indicated by $A_1$, $B_2$, $C_2$, $D_2$. The amount of compression x3 in this case is geometrically determined by the following equation (3):

$$x_1 = r(\cos\theta_1 - \cos\theta_2)$$
$$x_2 = r(\cos\theta_3 - \cos\theta_4)$$
$$x_3 = (x1 + x2)/2$$
$$= (r/2)\{(\cos\theta_1 - \cos\theta_2) + (\cos\theta_3 - \cos\theta_4)\}$$
(3)

where $\theta_3$: angle of inclination of the link $C_1D_2$ after setting the level difference;

$\theta_4$: angle of inclination of the link $C_2D_2$ after completion of the joining;

$x_1$: amount of displacement of the dimension a from the fulcrum $B_1$ to $B_2$ after the depression;

$x_2$: amount of displacement of the dimension a from the fulcrum $C_1$ to $C_2$ after the depression;

$x_3$: amount of displacement of the dimension a from a joining point $E_1$ to $E_2$ after the depression. (the joining point $E_1$ is assumed to be the central point of a length $L_1$ of the segment $B_1C_1$)

Figure 23:
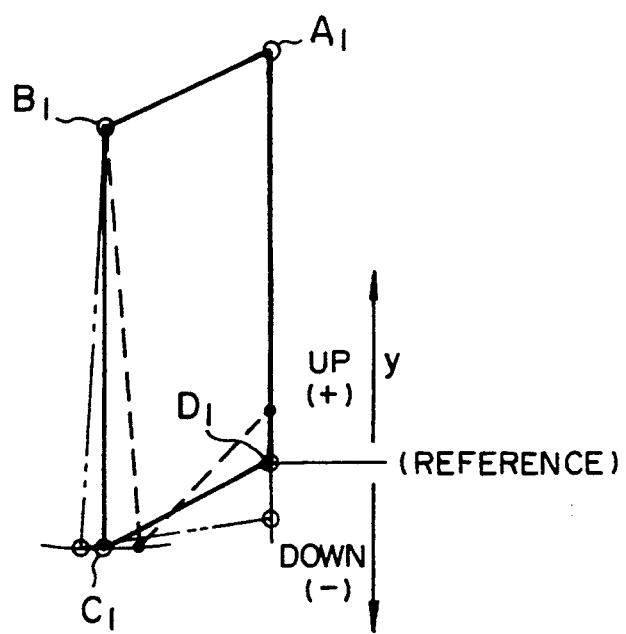
FIG. 23 is a diagram showing principles of operation of the link mechanism shown in FIG. 22.
Figure 24:
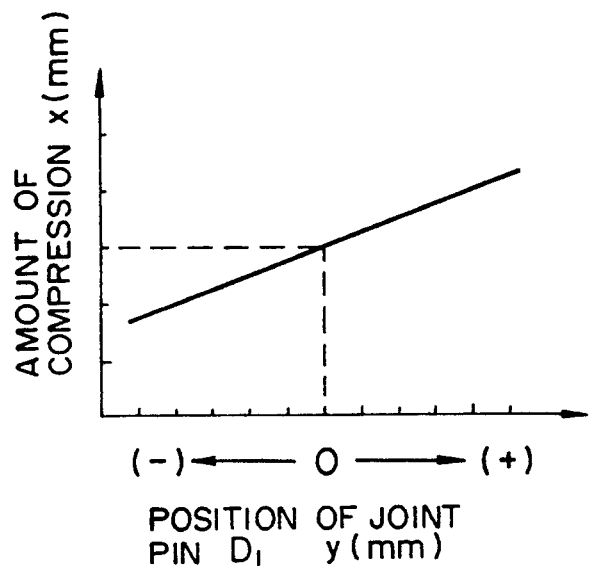
FIG. 24 is a graph showing the relationship between a position y of a joint pin $D_1$ and an amount of compression x in the link mechanism shown in FIG. 22.

FIGS. 23 and 24 show the relationship between the vertical position y of the joint pin $25d$ (fulcrum $D_1$) and the amount of compression x. As will be seen from those drawings, given the amount of level difference a between the bars being constant, the optimum amount of compression x is obtained by adjusting the vertical position y of the joint pin $25d$ (fulcrum $D_1$) More specifically, as the fulcrum $D_1$ is raised from the reference position to increase the inclination angle of the link 22 (segment $C_1D_1$), the amount of compression x becomes larger. On the contrary, as the fulcrum $D_1$ is lowered to decrease the inclination angle of the link 22, the amount of compression x becomes smaller.

As explained above, with this embodiment, by adjusting the position of the joint pin $25d$, the amount of compression can be adjusted to an optimum value depending on the bar thickness and shapes of the cut end face.

Also, even when those metal dies having the jagged surfaces are used and the joined portions of the bars are hard to depart from the metal dies because of biting into the metal die surfaces, the joined portions of the bars can be lifted for smooth delivery.

Further, even with the support structure of the metal die unit including a backlash (play), the backlash can be absorbed to prevent a reduction in the amount of compression of the bars and ensure the required joining strength between the bars.

While the above embodiment is explained as adjusting the amount of compression by vertically moving the joint pin $25d$, it is needless to say that the amount of compression can also be adjusted by moving the joint pin $25d$ horizontally or obliquely. Additionally, by using an eccentric pin as the joint pin, the similar operating effect can be obtained with a simple mechanism. Although the structure becomes rather complicated, the amount of compression can also be adjusted by arranging the other joint pins $25a$ to $25c$ to be likewise adjustable in their positions. While the description is made by taking a parallelogram link as a typical example, the amount of compression can be similarly varied by changing the lengths of the links 21 and 22, or making the spacing between the joint pins $25a$ and $25d$ of the first metal die frame 23 different from the spacing between the joint pins $25b$ and $25c$ of the second metal die frame 24.

Sixth Embodiment of Joining Apparatus

A sixth embodiment of the present invention will be explained with reference to FIGS. 25 and 26.

Figure 25:
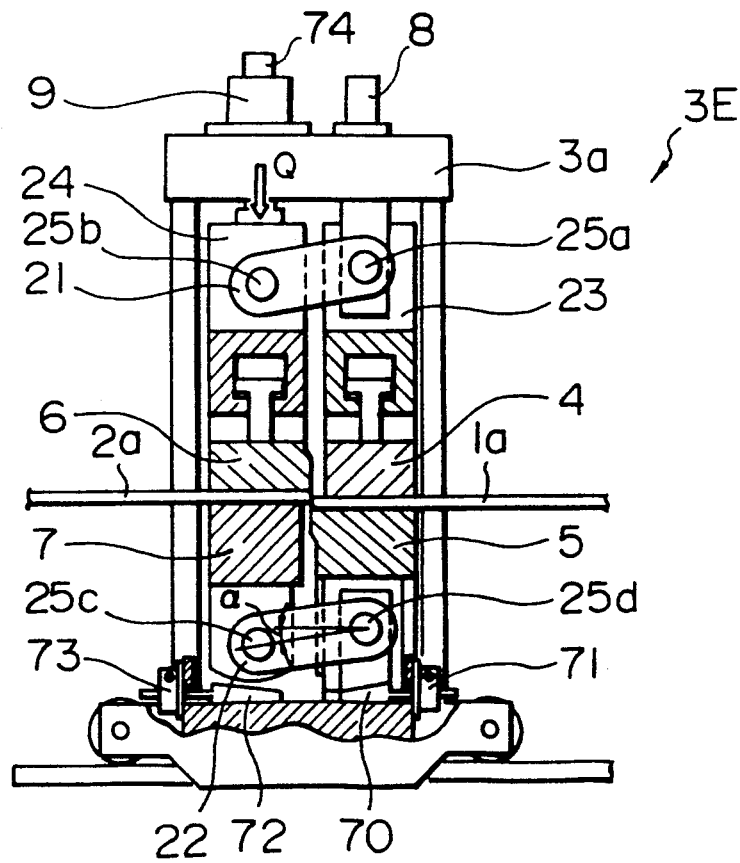
FIG. 25 is a partial sectional side view of an apparatus for joining hot strips according to a sixth embodiment of the present invention.

In FIG. 25, a first metal die frame 23 is vertically movably supported by a hydraulic cylinder 8 and its lower limit is given by a sloped stopper 70. The back-and-forth position of the sloped stopper 70 is adjusted by a drive motor (not shown) and a worm speed reducer 71. Likewise, a second metal die frame 24 is vertically movably supported by a hydraulic cylinder 9 and its lower limit is given by a sloped stopper 72. The back-and-forth position of the sloped stopper 72 is adjusted by a drive motor (not shown) and a worm speed reducer 73. By adjusting the back-and-forth position of the sloped stoppers 70, 72, the level difference amount of the bar 1 and the depression amount of the bar 2 can be easily adjusted.

Furthermore, a servo valve 74 is connected to the hydraulic cylinder 9 so that the second metal die frame 24 is depressed while undergoing minute oscillation (approximately 100 Hz) in various waveforms by a combination of the servo valve 74 and the hydraulic cylinder 9, thereby applying the minute oscillation along the end face of the succeeding bar 2.

Figure 26:
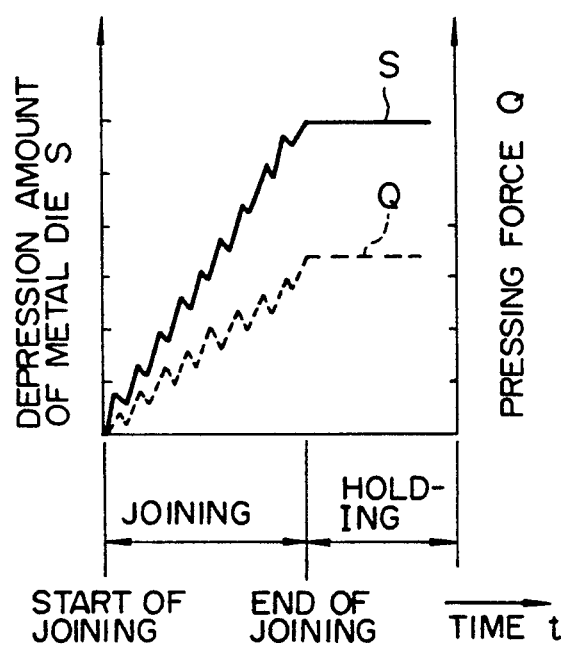
FIG. 26 is a graph showing the relationship of a joining time t versus a depression amount S and a pressing force Q in the joining apparatus shown in FIG. 25.

FIG. 26 shows the relationship of a joining time t versus a depression stroke S of the metal die and a pressing force Q as resulted when the pressing force Q is applied while giving minute oscillation to the succeeding bar 2 held between the metal dies 6 and 7 of the second metal die frame 24. During the joining step, the succeeding bar is depressed while undergoing the minute oscillation by a combination of the servo valve 74 and the hydraulic cylinder 9 as mentioned above, followed by completing the joining step. Then, after topping the minute oscillation of the bar, the bar is kept in a state where the pressing force Q is maintained.

The test conducted by the inventors has proved that the satisfactory joining strength can be obtained by applying the minute oscillation under conditions of the bar thickness of 40 mm, the depression speed of 100 mm/sec and the joining time t of about 0.4 sec, and then keeping the bar for about 1 sec without the minute oscillation. Note metal die frame 23 or to both the first and second metal die frames 23, 24. As an alternative, the minute oscillation may be produced by utilizing ultrasonic waves.

With this embodiment, the level difference amount between the preceding bar and the succeeding bar in the direction of bar thickness and the depression amount of the second metal die frame 24 can be easily adjusted depending on the thickness of the bars. Also, by applying the pressing force Q while giving the minute oscillation, crashing and dispersion of the oxide scales on the surfaces of the joined portions of the bars are accelerated to enhance the joining strength.

Note that while the above embodiments of FIGS. 9 to 26 are arranged to form the metal dies of the first metal die frame as clamping metal dies for setting the level difference by depressing the preceding bar 1, and form the metal dies of the second metal die frame as pressing metal dies for depressing the succeeding bar 2 to join the bars together, the similar operating effect can also be obtained by pushing up the first metal die frame and then pushing up the second metal die frame to thereby join the bars together in a reversed manner. Further, exactly the same operating effect can also be obtained by forming the metal dies of the first metal die frame as pressing metal dies for depressing the preceding bar to join the bars together, and forming the metal dies of the second metal die frame as clamping metal dies for setting the level difference. In addition, while the pressing force is applied by vertically moving one of the first and second metal die frames, the joining of bars can also be similarly performed by pushing up or down the first and second metal die frames in opposite directions so as to cause a relative slide between the bar 1 and the bar 2.

Still Other Embodiments

Embodiments for ensuring more positive joining in the joining method of the present invention will be next described. When bars are joined to each other and processed by continuous rolling, back-up is required in the actual operation to prevent the joined ends of the bars from disconnecting due to fluttering (in both the directions of thickness and width of the bar) during the feeding until the joined bars are brought into the rolling mill stand. In still other embodiments, projections in a predetermined pattern are provided on the surfaces of a clamping metal die and a pressing metal die to produce the zigzag-like joining line, so that the joined bars may endure fluttering caused during the feeding and may be prevented from disconnecting.

Figure 27A:
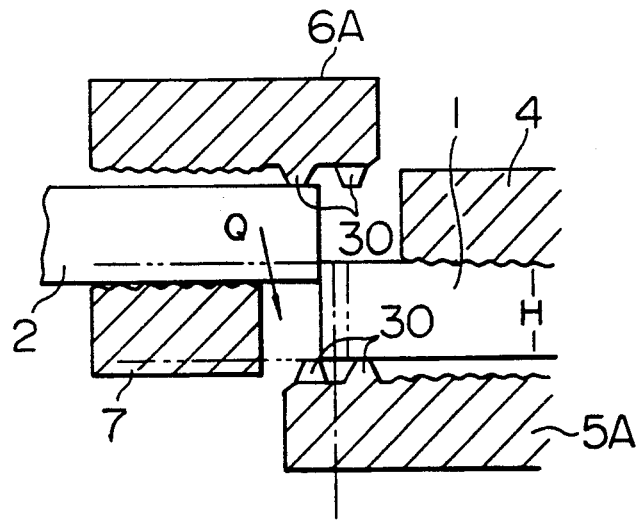
FIGS. 27(A) and 27(B) show one embodiment of the joining method of the present invention adapted for zigzag-like joining, FIGS. 27(A) and 27(B) in the drawing respectively being sectional views of metal dies before and after the joining.
Figure 27B:
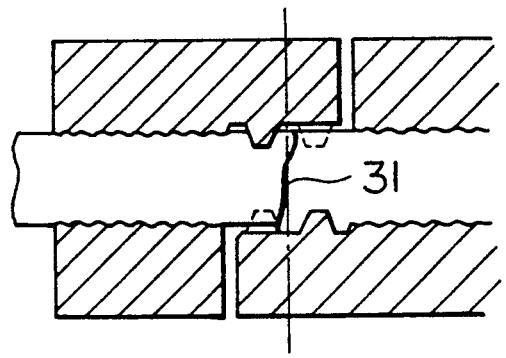
Figure 28:
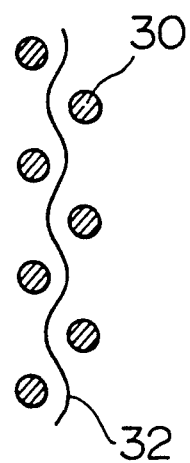
FIG. 28 is a plan view showing a sectional configuration of the zigzag-like joined portion and spike-like projections in the embodiment of FIGS. 27(A) and 27(B).

More specifically, in FIGS. 27(A) and 27(B), a plurality of spike-shaped projections 30 are formed on the surface of a clamping metal die 5A and the confronting surface of a pressing metal die 6A. As shown in FIG. 28, the projections 30 are each circular in section and arranged in a zigzag pattern with respect to the joining line between the end faces of the bars extending in the direction of bar width. Because of the upper and lower projections 30 biting into the bars, the joined end faces are forced to strongly protrude toward the opposite bar end face. As a result, the joining line 31 in the direction of bar thickness is curved as shown in FIG. 27(B) and, therefore, the joined ends will not disconnect even if the preceding bar 1 is rattled upwardly, for example, during the feeding. Since the projections 30 are arranged in a zigzag pattern, the joining line corresponding to the adjacent projections is curved in a direction opposite to the curve shown in FIG. 27(B). Thus, the joined ends will not disconnect even if the preceding bar 1 is rattled downwardly during the feeding. On the other hand, since a joining line 32 in the direction of bar width is also in the zigzag form as shown in FIG. 28, the joined bars can endure fluttering in the direction of bar width as well.

In order to ensure such a resistive property against disconnection due to fluttering, it is further important to control the feed speed of the bars so that the succeeding bar 2 is pushed into the preceding bar 1 (with a compression force) to avoid tension from acting on the joined ends in the direction of bar length. Once the joined bars are brought into a rolling mill stand at the first stage, the joining strength is so intensified through rolling in that stage as to provide conditions enough to endure tension rolling in the downstream stages.

Figure 29:
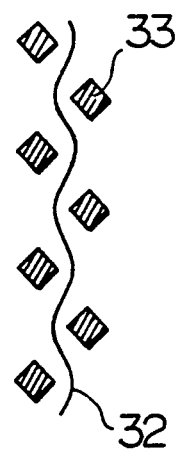
FIG. 29 is a view similar to FIG. 28, showing another sectional configuration of the spike-like projections.

While the projections 30 each have a circular section in FIG. 28, projections 33 each having a rhombic section may be provided as shown in FIG. 29 with the similar operating effect to the case of FIG. 28.

Still other embodiments of projections provided to make the joining line in a zigzag pattern will be explained with reference to FIGS. 30 to 32.

Figure 30:
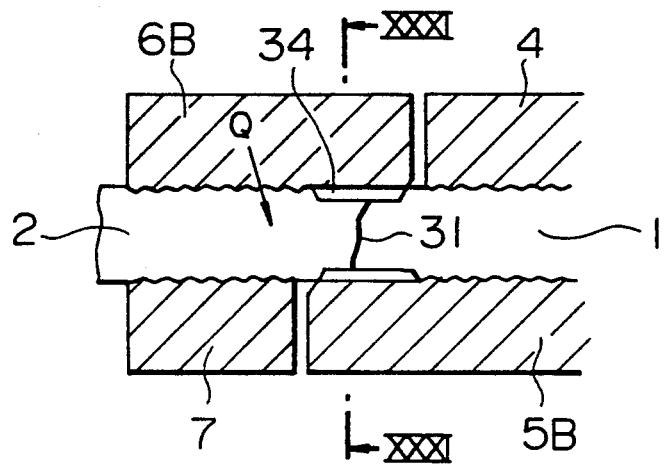
FIG. 30 is a sectional view of metal dies, showing another embodiment of the joining method of the present invention adapted for zigzag-like joining.
Figure 31:
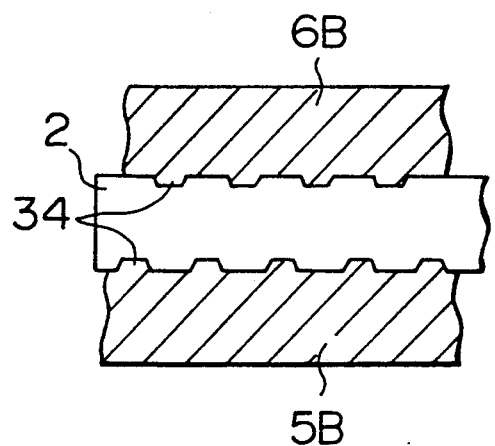
FIG. 31 is a sectional view taken along line XXXI—XXXI in FIG. 30.
Figure 32:
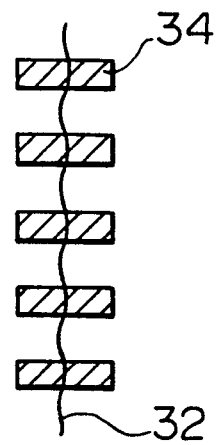
FIG. 32 is a plan view showing a sectional configuration of the zigzag-like joined portion and rack tooth-like projections in the embodiment of FIG. 30.

In FIGS. 30 and 31, a plurality of rack tooth-shaped projections 34 are formed on the surface of a clamping metal die 5B and the confronting surface of a pressing metal die 6B. The projections 34 are each rectangular as shown in FIG. 32 and arranged in straddling relation to the joining line 32 in the direction of bar width. Because of these upper and lower projections 34 biting into the bars, the joined end faces are deformed to provide the similar joining lines 31, 32 to the above embodiment. In this case, an extent of the zigzag pattern is reduced, but the effect of preventing disconnection of the joined bars has been confirmed with the test conducted by the inventors.

Yet other embodiments for ensuring more positive joining of bars will be explained below. In the embodiments of FIGS. 6 to 26, of the metal dies 4, 5 and 6, 7, the clamping lower metal die 5 and the pressing upper metal die 6 are overlapped with each other at their end portions in confronting relation. Then, the pressing force Q is set such that the pressing metal die bites into the bar by the pressing force upon completion of the joining step. As a result, the joining line in the direction of bar thickness becomes wavy as shown in FIG. 33(A) and the joining strength against fluttering (vibration) in the direction of bar thickness is improved. It is rare that the preceding bar and the succeeding bar have the same thickness and width, and their dimensions are different from each other in many cases. FIGS. 33(B) and 33(C) show states where bars having different thicknesses are joined together according to the present invention. By setting the pressing force Q such that the pressing metal die bites into the bar by the pressing force upon completion of the joining step, as stated above, an extent of the step produced due to the difference in bar thickness is reduced. Also, by feeding the bars in the direction of an arrow, it will not happen that the stepped joined portion is caught by the feed table and the joined bars are disconnected.

Figure 34A:
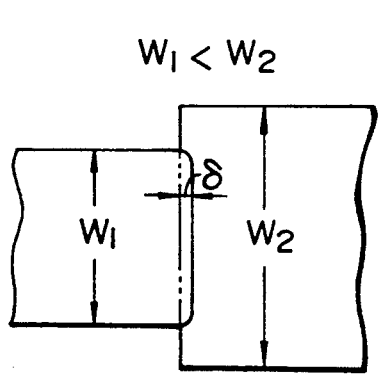
FIG. 34 is a diagram showing one embodiment of the joining method of the present invention adapted for the case of bars being different in width from each other.
Figure 34B:
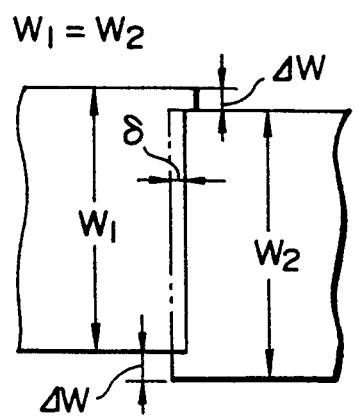

Further, when bars have different widths from each other ($W1 < W2$) as shown in FIG. 34(A), the joining is completed in such a state that the bar of narrow width W1 bites into the opposite bar of wide width W2 and, therefore, edge cracking in rolling at the next step can be avoided. On the other hand, when bars have the same width ($W1 < W2$) as shown in FIG. 34(B), the similar operating effect can be obtained by joining the bars in such a state that they are intentionally shifted by $\Delta W$ in the direction of width.

Others

While the above embodiments are explained as sliding the end faces of the bars by the joining machine in the direction of bar thickness H, the relative slide may be produced in the direction of bar width W as described in connection with FIGS. 2 and 4. In this case, the size of the joining machine is increased, but the slide stroke of the contact surfaces of the bars can be taken large and the descaling effect is enhanced. Also, by increasing the sliding speed, a temperature rise due to the heat produced at the contact surfaces becomes large. Thus, the latter method is effective for joining bars which are made of material with hard to crush scales thereon or are at relatively low temperatures.

All the joining machines are shown as the traveling type in the above description. It is however apparent that depending on given system conditions, the joining machine may be fixed and a looper for bars may be provided on the outlet side for only the joining time, or the traveling type joining machine may be combined with a looper, or any other suitable combinations may be adopted.

Also, the above description is made as adopting the traveling type joining machine and reciprocating it by a single cylinder. Alternatively, it is also applicable to provide a push cylinder of short stroke for accelerating the joining machine, move the joining machine together with the preceding bar by the clamping force of the metal dies after synchronization with the bar speed, and return it to the original position by a dedicated return cylinder after opening the clamp. This method is particularly effective in controlling the position of the bar with high accuracy.

While the above embodiments are explained as joining bars after rough-rolling, the present invention is also similarly applicable to a joining apparatus for joining slabs before rough-rolling.

The joining time in the above embodiments will now be mentioned. In the embodiment shown in FIG. 6, since the clamping and pressing take place at the same time, the joining time is defined by 1 second at the press speed of 100 mm/sec given the stroke being 100 mm, plus 1 second for opening the clamp, plus about 0.1 second required for accelerating the bar up to 60 m/min at the acceleration g, for example, namely 2.1 seconds in total. Thus, 3 seconds suffice in consideration of safety allowance. In the embodiment of FIG. 9, the joining time is approximately 5 seconds. Furthermore, since swellings from the underside will not occur by being suppressed by the metal die, the treatment for removing such swellings is not required. Assuming now that the original thickness of the bar is 40 mm, the bar thickness at the outlet side of the finishing train is 2 mm, and the rolling speed is 1200 m/min, the inlet-side speed Vd of the bar is 1/20 of the rolling speed, i.e., 60 m/min. With the above embodiments taking the joining time of 3 to 5 seconds, the traveling distance becomes 3 to 5 m. This means that the system construction requires not to be increased in its scale and is quite simple.

As described above, the embodiments of the present invention are adapted to join bars together on the inlet side of a finishing train and then bring the joined bars into continuous rolling in a hot rolling mill system for steel or aluminum plates. End faces of the bars to be joined are relatively slid in such directions as mutually biting into the opposite end face, whereby the bars can be momentarily joined together with a compression force and a plastic deformation produced between both the end faces due to the wedge effect, while crushing and removing oxide scales on the end faces. In comparison with the hot melting method which is expected to be practicable in joining bars at present, the joining time is shortened to about 1/10 and the travel stroke is reduced from 25 m to 5 m or below in the case of the traveling type joining machine. The comparable difference in the travel stroke can be obtained in the looper type joining machine as well. It is therefore possible to design the program for a hot rolling mill system in practical sense.

Thus, the embodiments of the present invention enable continuous joining in a hot rolling line, which has been the problem facing the rolling industry since a long time, with quite simple structure and operation.

SUMMARY OF ADVANTAGES

As will be apparent from the above description, the present invention can provide the following advantages.

(1) Since the end face of a trailing end of a preceding strip and the end face of a leading end of a succeeding strip are subjected to a relative slide between surfaces of both the end faces while being pressed against each other so as to cause a plastic deformation, both the strips can be surely joined together in a short time for realization of continuous hot rolling.

(2) Since at least one of the trailing end of the preceding strip and the leading end of the succeeding strip is moved relative to the other in such a direction as inclined with respect to the end face of the opposite strip end, both the relative slide and the pressing inclusive of the plastic deformation can be effected by one operation.

(3) Since the joined surfaces of the preceding strip and the succeeding strip are deformed into a zigzag pattern, separation of the joined strips during the feeding can be prevented and stable continuous hot rolling is enabled.

(4) Since the preceding strip and the succeeding strip are joined to each other by shifting the edges of one strip the direction of strip width from the edges of the other strip in the direction of strip width, edge cracking can be prevented.

(5) With the relative slide between both the end faces and the pressing inclusive of the plastic deformation, both the strips can be surely joined together in a short time. A horizontal force produced due to the wedge effect when pressing the strip end faces is borne by link means and will not act on vertically movable members in a body frame, thus achieving a reduction in the size of the joining apparatus. Also, since no mechanically sliding portions are present during the pressing to join strips and frame members are instead supported by the link means, the mechanical loss becomes small and the output of first actuating means can be reduced.

(6) Since an amount of compression, an mount of level difference and an amount of depression of the metal die can be easily adjusted depending on a thickness of the strip and shapes of the cut end face, automatic operation is enabled.

(7) No swellings occur at the joined boundary, and the joining strength enough to ensure satisfactory feeding and rolling of the strips is obtained.

(8) Even in the case of metal dies having jagged surfaces, the strips can be easily separated from the metal dies after the joining step and the joined strips can be smoothly fed.

(9) Since a play in the link means is removed, it is possible to accurately adjust the amount of compression and improve reliability of the joining.

(10) Since oxide scales on both end faces of the strips can be sufficiently removed, the joining strength is enhanced.

(11) Combination of the above advantages enables realization of a strip joining apparatus in a hot rolling mill system which can join strips to each other in a short time and is superior in points of economy and operability.

What is claimed is:

1. A hot strip joining method of joining a preceding strip and a succeeding strip to each other in a line of a hot rolling mill system, wherein said method comprises the steps of:
   (a) causing one of a trailing end of said preceding strip and a leading end of said succeeding strip to abut against an end face of the other with the end faces being offset from each other in a direction of thickness of the strips; and
   (b) moving at least one of the trailing end of said preceding strip and the leading end of said succeeding strip relative to the other in a direction toward the end face of the other strip end so as to remove said offset while maintaining abutting of the end faces, whereby the end face of the trailing end of said preceding strip and the end face of the leading end of said succeeding strip are pressed against each other so as to cause a plastic deformation and also a relative slide between surfaces of both of the end faces, thereby joining both of said strips together.

2. A hot strip joining method according to claim 1, wherein when causing said relative slide, said preceding strip and said succeeding strip are relatively moved to come closer to each other, thereby causing said plastic deformation.

3. A hot strip joining method according to claim 1, wherein at least one of the trailing end of said preceding strip and the leading end of said succeeding strip is moved relative to the other in a direction inclined with respect to the end face of the other strip end, thereby causing said relative slide and said plastic deformation.

4. A hot strip joining method according to claim 1, wherein at least one of the trailing end of said preceding strip and the leading end of said succeeding strip is inclined relative to the other, and the trailing end of said preceding strip and the leading end of said succeeding strip are clamped such that both the ends are shifted from each other with one of the ends abutting against the other, and then at least one of the trailing end of said preceding strip and the leading end of said succeeding strip is relatively moved in a direction in which said shift between both the ends disappears, thereby causing said relative slide and said plastic deformation.

5. A hot strip joining method according to claim 1, wherein the trailing end of said preceding strip and the leading end of said succeeding strip are clamped such that both the ends are shifted from each other with one of the ends abutting against the other, and then at least one of the trailing end of said preceding strip and the leading end of said succeeding strip is relatively moved in a direction inclined with respect to the end face of the other strip end, thereby causing said relative slide and said plastic deformation.

6. A hot strip joining method according to claim 1, wherein at least one of the trailing end of said preceding strip and the leading end of said succeeding strip is bent, and the trailing end of said preceding strip and the leading end of said succeeding strip is clamped such that the bent end is abutting against the other, and then the bent end is straightened to thereby cause said relative slide and said plastic deformation.

7. A hot strip joining method according to claim 1, wherein at least one end face of the trailing end of said preceding strip and the leading end of said succeeding strip is cut obliquely, and the trailing end of said preceding strip and the leading end of said succeeding strip are clamped such that both the ends are shifted from each other with one of the ends abutting against each other, and then at least one of the trailing end of said preceding strip and the leading end of said succeeding strip is relatively moved in a direction in which said shift between both the ends disappears, thereby causing said relative slide and said plastic deformation.

8. A hot strip joining method according to claim 1, wherein said relative slide is caused in the direction of thickness of said strip.

9. A hot strip joining method of joining a preceding strip and a succeeding strip to each other in a line of a hot rolling mill system, said method comprising pressing an end face of a trailing end of said preceding strip and an end face of a leading end of said succeeding strip against each other so as to cause a plastic deformation and also a relative slide between surfaces of both the end faces, thereby joining both said strips together, wherein said relative slide is caused in the direction of width of said strip.

10. A hot strip joining method of joining a preceding strip and a succeeding strip to each other in a line of a hot rolling mill system, said method comprising pressing an end face of a trailing end of said preceding strip and an end face of a leading end of said succeeding strip against each other so as to cause a plastic deformation and also a relative slide between surfaces of both the end faces, thereby joining both said strips together, wherein when causing said relative slide while pressing both the end faces of said strips, the joined surfaces of said preceding strip and said succeeding strip are deformed into a zigzag pattern.

11. A hot strip joining method of joining a preceding strip and a succeeding strip to each other in a line of a hot rolling mill system, said method comprising pressing an end face of a trailing end of said preceding strip and an end face of a leading end of said succeeding strip against each other so as to cause a plastic deformation and also a relative slide between surfaces of both the end faces, thereby joining both said strips together, wherein said preceding strip and said succeeding strip are joined to each other with edges of one strip in the direction of strip width being shifted from edges of the other strip in the direction of the strip width.

12. A hot strip joining method of joining a preceding strip and a succeeding strip to each other in a line of a hot rolling mill system, said method comprising pressing an end face of a trailing end of said preceding strip and an end face of a leading end of said succeeding strip against each other so as to cause a plastic deformation and also a relative slide between surfaces of both the end faces, thereby joining both said strips together, wherein when causing said relative slide while pressing both the ends of said strips, at least one of said preceding strip and said succeeding strip is oscillated.

13. A continuous hot rolling method in a hot rolling mill system including at least one roughing mill stand and a training of finishing mill stands, comprising the steps of:
(a) rolling a plurality of slabs by said roughing mill stand to successively obtain bars;
(b) joining said bars to each other;
(c) continuously rolling said joined bars by said train of finishing mill stands;
(d) said joining of said bars to each other comprising the steps of:
(i) causing one of a trailing end of said preceding bar and a leading end of said succeeding bar to abut against an end face of the other with the end faces being offset from each other in a direction of thickness of the bars; and
(ii) moving at least one of the trailing end of said preceding bar and the leading end of said succeeding bar relative to the other in a direction toward the end face of the other bar end so as to remove said offset while maintaining abutting of the end faces,
whereby an end face of the trailing end of a preceding bar and the end face of a leading end of a succeeding bar are pressed against each other so as to cause a plastic deformation and also a relative slide between surfaces of both of the end faces for joining of said bars.

14. A hot strip joining apparatus for joining a preceding strip and a succeeding strip to each other in a line of a hot rolling mill system, comprising:
(a) first and second metal die means for independently clamping a trailing end of said preceding strip and a leading end of said succeeding strip, respectively, so as to cause one of the trailing end of said preceding strip and the leading end of said succeeding strip to abut against an end face of the other with the end faces being offset from each other in a direction of thickness of the strips;
(b) drive means for actuating at least one of said first and second metal die means such that at least one of the trailing end of said preceding strip and the leading end of said succeeding strip is moved relative to the other in a direction toward the end face of the other strip end so as to remove said offset while maintaining abutting of the end faces, whereby the end face of the trailing end of said preceding strip and the end face of the leading end of said preceding strip and the end face of the leading end of said succeeding strip are pressed against each other so as to cause a plastic deformation and also a relative slide between surfaces of both of the end faces, thereby joining both of said strips together.

15. A hot strip joining apparatus according to claim 14, wherein said drive means includes means for vertically moving each of said first and second metal die means.

16. A hot strip joining apparatus according to claim 15, wherein said first and second metal die means are adapted to clamp the trailing end of said preceding strip and the leading end of said succeeding strip such that at least one of the trailing end of said preceding strip and the leading end of said succeeding strip is inclined relative to the other and such that both the ends are shifted from each other with one of the ends abutting against the other, and said drive means is adapted to actuate at least one of said first and second metal die means in a direction in which said shift between both the ends disappears.

17. A hot strip joining apparatus according to claim 15, wherein said first and second metal die means are adapted to clamp the trailing end of said preceding strip and the leading end of said succeeding strip such that both the ends are shifted from each other with one of the ends abutting against the other, and said drive means is adapted to actuate at least one of said first and second metal die means in a direction in which one of the trailing end of said preceding strip and the leading end of said succeeding strip is moved toward the end face of the other strip end and in which said shift between both the ends disappears.

18. A hot strip joining apparatus according to claim 14, further comprising position adjusting means for adjusting a vertical position of said strips.

19. A hot strip joining apparatus according to claim 14, further comprising transfer means for moving said first and second metal die means and said drive means in a direction of advance of said strips.

20. A hot strip joining apparatus according to claim 14, wherein said first and second metal die means each have a plurality of spike-shaped projections on their surfaces for clamping said strips, said plurality of projections being arranged in a zigzag pattern with respect to a joining line defined by the joined surfaces of said strip ends.

21. A hot strip joining apparatus according to claim 14, wherein said first and second metal die means each have a plurality of rack tooth-shaped projections on their surfaces for clamping said strips, said plurality of projections being arranged in straddling relation to a joining line defined by the joined surfaces of said strip ends.

22. A hot strip joining apparatus according to claim 14, wherein said drive means includes actuator means for producing a drive force to act on at least one of said first and second metal die means, and link means for operatively connecting said first and second metal die means whereby one of said first and second metal die means is moved relative to the other in a direction inclined toward the other upon acting of the drive force produced by said actuator means.

23. A hot strip joining apparatus for joining a preceding strip and a succeeding strip to each other in line of a hot rolling mill system, comprising:
(a) first and second movable metal die means for independently clamping a trailing end of said preceding strip and a leading end of said succeeding strip, respectively;
(b) first actuator means for producing a drive force to act on at least one of said first and second metal die means;

(c) link means for operatively connecting said first and second metal die means whereby one of said first and second metal die means is moved relative to the other in a direction inclined toward the other upon acting of the drive force produced by said first actuator means.

24. A hot strip joining apparatus according to claim 23, wherein said link means constitutes a quadrilateral link in cooperation with said first and second metal die means.

25. A hot strip joining apparatus according to claim 23, wherein said link means includes a plurality of links and a plurality of joint pins, and at least one of said plurality of joint pins is adjustable in its position, whereby an amount of movement of one said metal die means in a direction of strip length as resulted upon acting of the drive force produced by said first actuator means can be adjusted.

26. A hot strip joining apparatus according to claim 23, further comprising first stopper means for limiting an amount of movement of one said metal die means in a direction perpendicular to the direction of strip length as resulted upon acting of the drive force produced by said first actuator means, said first stopper means being adjustable in its level of height.

27. A hot strip joining apparatus according to claim 23, further comprising second actuator means for moving one of said first and second metal die means relative to the other to form a level difference between both said metal die means in a direction perpendicular to the direction of strip length, and said link means is constructed such that the position of a fulcrum concerning said one metal die means remains the same when said one metal die means is moved by said second actuator means.

28. A hot strip joining apparatus according to claim 27, further comprising second stopper means for limiting an amount of movement of one said metal die means in a direction perpendicular to the direction of strip length when moved by said second actuator means, said second stopper means being adjustable in its level of height.

29. A hot strip joining apparatus according to claim 23, wherein said first and second metal die means each include a pair of upper and lower metal dies, the lower metal die of said first metal die means having a length sufficient to support both the trailing end of said preceding strip and a part of the leading end of said succeeding strip, and the upper metal die of said second metal die means having a length sufficient to support both the leading end of said succeeding strip and a part of the trailing end of said preceding strip.

30. A hot strip joining apparatus according to claim 23, further comprising elevatable lift means for lifting said preceding strip and said succeeding strip from the surfaces of said first and second metal die means after they are joined.

31. A hot strip joining apparatus according to claim 23, further comprising means for applying a force beforehand in a direction of load acting on said link means so as to remove a play.

32. A hot strip joining apparatus according to claim 23, further comprising means for oscillating at least one of said preceding strip and said succeeding strip when one said metal die means is moved by said link means in a direction inclined toward the other metal die means.

33. A continuous hot rolling mill system including at least one roughing mill stand and a train of finishing mill stands, comprising:
 a joining apparatus installed between said roughing mill stand and said train of finishing mill stands for successively joining bars rolled by said roughing mill stand, said joining apparatus comprising:
 (a) first and second metal die means for independently clamping a trailing end of a preceding strip and a leading end of a succeeding strip, respectively;
 (b) drive means for actuating at least one of said first and second metal die means such that one of the trailing end of said preceding strip and the leading end of said succeeding strip is moved relative to the other in a direction inclined toward an end face of the other strip end.

34. A continuous hot rolling mill system including at least one roughing mill stand and a train of finishing mill stands, comprising:
 a joining apparatus installed between said roughing mill stand and said train of finishing mill stands for successively joining bars rolled by said roughing mill stand, said joining apparatus comprising:
 (a) first and second movable metal die means for independently clamping a trailing end of said preceding strip and a leading end of said succeeding strip, respectively;
 (b) first actuator means for producing a drive force to act on at least one of said first and second metal die means;
 (c) link means for operatively connecting said first and second metal die means whereby one of said first and second metal die means is moved relative to the other in a direction inclined toward the other upon acting of the drive force produced by said first actuator means.

* * * * *